(12) United States Patent
Helfenstein et al.

(10) Patent No.: US 11,137,276 B1
(45) Date of Patent: Oct. 5, 2021

(54) ALL DIGITAL TRAVEL TIME FLOW METER USING TIME REVERSED ACOUSTICS

(71) Applicant: GWF MessSysteme AG, Lucerne (CH)

(72) Inventors: Markus Helfenstein, Lucerne (CH); Florian Strasser, Lucerne (CH)

(73) Assignee: GWF MessSysteme AG, Lucerne (CH)

( * ) Notice: Subject to any disclaimer, the term of this patent is extended or adjusted under 35 U.S.C. 154(b) by 0 days.

(21) Appl. No.: 17/218,978

(22) Filed: Mar. 31, 2021

(51) Int. Cl.
*G01F 1/66* (2006.01)

(52) U.S. Cl.
CPC .............. *G01F 1/667* (2013.01); *G01F 1/662* (2013.01)

(58) Field of Classification Search
None
See application file for complete search history.

(56) References Cited

U.S. PATENT DOCUMENTS

| 5,650,571 A * | 7/1997 | Freud | G01F 1/667 |
| | | | 73/861.06 |
| 7,117,104 B2 * | 10/2006 | Urdaneta | G01F 1/66 |
| | | | 702/48 |

OTHER PUBLICATIONS

Zhang, "Match-Filter Ultrasonic Sensing Theory and Implementation," White Paper SLAA814, pp. 1-10, Dec. 2017, Texas Instruments Incorporated, Dallas, Texas, USA.

* cited by examiner

*Primary Examiner* — Harshad R Patel
(74) *Attorney, Agent, or Firm* — Myers Wolin, LLC

(57) ABSTRACT

A microcontroller and a method are provided for determining a flow velocity with an electronic processing unit of an ultrasonic travel time flow meter with arbitrary waveform signals. The electronic processing unit has receiver and transmitter terminals, a signal processing unit and a signal generating unit that is configured to generate an oscillating electric output signal with a time dependent amplitude, wherein the time-dependent amplitude varies according to stored signal parameters.

10 Claims, 16 Drawing Sheets

ALL DIGITAL TRAVEL TIME FLOW METER USING TIME REVERSED ACOUSTICS

FIELD OF THE INVENTION

The current application relates to flow meters, and in particular to ultrasound travel time flow meters.

BACKGROUND

Various types of flow meters are currently in use for measuring a volume flow of a fluid, such as a liquid or a gas, through a pipe. Ultrasonic flow meters are either Doppler flow meters, which make use of the acoustic Doppler effect, or travel time flow meters, sometimes also called transmission flow meters, which make use of a propagation time difference caused by the relative motion of source and medium. The travel time is also referred to as time of flight or transit time.

An ultrasonic travel time flow meter evaluates the difference of propagation time of ultrasonic pulses propagating in and against flow direction. Ultrasonic flow meters are provided as in-line flow meters, also known as intrusive or wetted flow meters, or as clamp-on flow meters, also known as non-intrusive flow meters. Other forms of flow meters include Venturi channels, overflow sills, radar flow meters, Coriolis flow meters, differential pressure flow meters, magnetic inductive flow meters, and other types of flow meters.

When there are irregular flow profiles or open channels, more than one propagation path may be necessary to determine the average flow speed. Among others, multipath procedures are described in hydrometric standards such as IEC 41 or EN ISO 6416. As a further application, ultrasonic flow meters are also used to measure flow profiles, for example with an acoustic Doppler current profiler (ADCP). The ADCP is also suitable for measuring water velocity and discharge in rivers and open waters.

Zhaohong Zhang, "Matched-Filter Ultrasonic Sensing: Theory and Implementation", White Paper SLAA814-December 2017 discloses an operation theory of a matched-filter based ultrasonic sensing technology and a single-chip implementation platform using (TI) MSP430FR6047 microcontroller.

SUMMARY OF INVENTION

It is an object of the present specification to provide an improved transit time flow meter and a corresponding computer-implemented method for measuring an average flow speed or a flow profile of a fluid in general, and in particular for liquids such as water and/or for gases.

In a flow measurement device according to the present specification, sound transducers, e.g. in the form of piezoelectric elements, also known as piezoelectric transducers, are used to generate and to receive a measuring signal.

Alternative sound transmitters comprise lasers that excite a metal membrane or other light absorbing surface to vibrations, or coil driven loudspeakers. According to other embodiments, the flow meter produces pressure waves in other ways, such as by way of a MEMS device, by using a piezoelectric membrane and so forth. The receiver side can also be represented by other means that are different from piezoelectric transducers, but detect ultrasonic waves.

Although the term "piezoelectric transducer" is used often in the present description, it stands also for other sound wave transducers that produce or detect ultrasonic waves.

A measuring signal according to the present specification can be modelled by a matched filter. When the word "signal" is used with reference to a signal manipulation step, it may in particular refer to a representation of a signal in a computer memory.

In particular, a signal representation can be defined by value pairs of digitized amplitudes and associated discrete times.

An ultrasonic flow meter according to the present specification can provide desired properties of a focusing property by using an arbitrary shaped signal, for an ultrasonic flow meter to obtain a signal with desired properties at a receiving transducer or through calculations after the receiving ADC.

By way of example, the frequency of sound waves that are used in a flow meter according to the invention can be between 20 kHz and 2 MHz, which corresponds to an oscillation period of 0.5 microseconds (p.$) but it may even be as high as 800 MHz.

In one aspect, the present specification discloses a microcontroller for determining a flow velocity with an ultrasonic travel time flow meter using a time reversed digitized signal. In particular, the flow meter can be "all digital" in the sense that the signal evaluation is done by digital signal processing and the electric signals applied to the ultrasonic transducers are step signals, which can also be regarded as digital signals. In other words, the electric signals have a sequence of discrete voltage levels which are constant over predetermined sampling times. Thereby, there is no need for a DAC with an analog part and the DAC can be replaced by a pulse generator.

The microcontroller is capable of generating arbitrary pulse signals. In particular, the microcontroller can be configured to output pulse trains with arbitrary frequency and length.

The microcontroller according to the present specification can comprise multiple buffer output terminals, for example four or eight output terminals, instead of only one. To this end, the microcontroller can comprise multiple buffers, for example four or eight buffers, in a parallel structure, which allows a time multiplexed output of all the signals to all the respective channels or buffers.

In other words, a transmitter path or a signal generation path in a chip or FGPA, or a path connected to such a chip or FPGA is operative to generate arbitrary pulse trains with arbitrarily chosen pulse length. Herein, "arbitrary" means arbitrary within a predetermined range and precision, for example within a pre-determined minimum and maximum frequency range and to within a pre-determined precision.

The microcontroller comprises a first receiver terminal for connecting a first ultrasonic transducer, a first transmitter terminal for connecting the first ultrasonic transducer, a second receiver terminal for connecting a second ultrasonic transducer, a second transmitter terminal for connecting the second ultrasonic transducer. The receiver terminals and the transmitter terminals are also referred as "connectors".

In one embodiment, the first receiver terminal and the first transmitter terminal and the second receiver terminal and the second transmitter terminal coincide. This can be especially useful when there is no overlapping sending and receiving.

The first receiver terminal and the second receiver terminal are connected to a signal processing unit or signal processing means, which is provided for evaluating received signals from the transducers. The signal processing unit comprises an analogue-to-digital converter (ADC) and an evaluation circuit. Different from a simple timer circuit, the ADC can provide various options to calculate the shape of a signal.

A predicted signal shape can be used to reduce sampling rate and/or amplitude resolution of the ADC. In particular, the power saving features can make use of a signal shape according to the present specification. The sampling rate and/or the accuracy amplitude of the amplitude digitization of the ADC can also be non-uniform and time-dependent to further reduce the power consumption and this time dependency may depend on a predicted signal shape. Furthermore, the ADC can be turned on only after a specified time after sending the measuring signal and turned off again after the response signal has been received.

The first transmitter terminal and the second transmitter terminal are connected to a signal generating unit. The signal generating unit comprising a memory for storing signal parameters and a buffer.

The signal generating unit and the signal processing unit are configured to send the oscillating electric output signal to the first transmitter terminal and to receive a response signal at the second receiver terminal and to derive a flow speed of a fluid from at least the received response signal.

In one embodiment, the buffer of the signal generating unit is connected to a pulse width modulation (PWM) unit, which is connected to a low-pass filter. A pulse-width modulation can provide a simple and robust way to generate an analog electrical signal from a digital signal, which is then applied to an ultrasonic transducer, such as a piezo-element, a piezo-membrane or a loudspeaker membrane, a microelectromechanical element or another type of transducer. By using power electronics, the output signal of a pulse-width modulation can be made sufficiently large such that in many cases no additional signal amplification is required. The PWM can provide a sufficient quality of the resulting analog signal.

The PWM of the microcontroller may also be used with a weak or no low pass filtering after the output of the buffer or the PWM to generate an output signal with a step shape or a step-like shape. To this end, the low pass filter can be provided as an adjustable or switchable low pass filter.

The PWM signals store amplitude information in the time information of the signal. The granularity of the time resolution has an impact on the resolution of the PWM-signal. For this reason, the PWM signal generator can be designed to provide a higher frequency than a comparable ADC, for example 10 times as high. The amplitude of the PWM signal generator may be the same or similar to a pulse generator.

In a further embodiment, the signal generating unit of the microcontroller comprises a field programmable gate array (FPGA), which is connected to a digital input/output connector. The signal generating unit is operative to derive the oscillating signal from an output signal of the FPGA, wherein the output signal of the FPGA is modified by providing programming instructions over the digital input/output connector.

In particular, the FPGA can contain a logic or circuit arrangement to derive a desired output signal from provided signal parameters. Among others the signal parameters may be read in from a memory, pre-computed or computed in real time. In one embodiment, the computation of the signal parameters from which the output signal is derived is dependent on a received signal.

In a further embodiment, the signal generating unit is configured to generate a signal train, the signal train comprising oscillating signal portions which are separated by pre-determined silent periods in which an output voltage is constant, in particular the output voltage can be zero during silent period. In one embodiment, the oscillating signal portions are repeated in regular intervals. In another embodiment, the duration of the oscillating signal portions and of the time intervals in between is determined by a computation. In particular, the computation of the time intervals can comprise a random component or jitter within a pre-determined magnitude range, whereby the oscillating signal portions have a randomly varying distance in time from each other.

According to a further embodiment, the signal generation of the oscillating signal comprises applying a pulse-width modulation and applying a low-pass filter to the output signal of the pulse-width modulation.

In yet a further embodiment, the signal generation of the oscillating signal comprises a generation of a signal train, the signal train comprising oscillating signal portions which are separated by pre-determined silent periods in which an output voltage is constant, wherein the constant voltage level can be zero.

During a measurement of a flow speed, the microcontroller applies the second measuring signal to one of the transducers, receives a response signal to the second measuring signal at the other one of the transducers and processes the response signal to derive a flow speed.

According to one aspect, the current specification discloses a computer implemented method for determining a flow speed of a fluid in a fluid conduit or channel, in particular in a pipe or tube, using a transmission time ultrasonic flow meter. In a preferred embodiment, "computer implemented" refers to an execution on small scale electronic components such as microprocessors, ASICs, FPGAs and the like, which can be used in portable or in compact stationary digital signal processing devices, which are generally of a smaller size than workstations or mainframe computers and which can be placed at a required location along a fluid pipe.

In the following, the terms "channel", "conduit", "passage", etc. are used as synonyms. The subject matter of the application can be applied to all types of conduits for fluids independent of their respective shape and independent of whether they are open or closed. The subject matter of the application can also be applied to all types of fluids or gases, whether they are gases or liquids, or a mixture of both.

Throughout the application, the term "computer" is often used. Although a computer includes devices such as a laptop or a desktop computer, the signal transmission and receiving can also be done by microcontrollers, application specific integrated circuits (ASICs), FPGAs, etc.

Furthermore, a connection line between the transducers may be offset with respect to a centre of the fluid conduit in order to obtain a flow speed in a predetermined layer and there may be more than one pair of transducers. Furthermore, the measuring signal may be provided by more than one transducer and/or the response signal to the measuring signal may be measured by more than one transducer.

Furthermore, the current specification discloses a flow measurement device with a first piezoelectric transducer that is connected to the first connector, and with a second ultrasonic transducer, such as piezoelectric transducer, that is connected to the second connector. In particular, the ultrasonic transducers, such as piezoelectric transducers may be provided with attachment regions, such as a clamping mechanism for attaching them to a pipe.

Furthermore, the current specification discloses a flow measurement device with a pipe portion. The first ultrasonic transducer, such as piezoelectric transducer is mounted to the pipe portion at a first location and the second ultrasonic transducer, such as piezoelectric transducer is mounted to the pipe portion at a second location. In particular, the transducers may be clamped to the pipe portion. Providing the device with a pipe portion may provide benefits when the device is pre-calibrated with respect to the pipe portion.

The device can be made compact and portable. A portable device according to the present specification, which is equipped with surface mountable transducers, such as clamp-on transducers, can be used to check a pipe on any accessible location. In general, the device may be stationary or portable. Preferentially, the device is sufficiently compact to be placed at a required location and sufficiently protected against environmental conditions, such as humidity, heat and corrosive substances.

In particular, the application specific electronic components may be provided by electronic components comprising the abovementioned computer readable memory. According to other embodiments, the application specific electronic components are provided by components with a hard-wired or with a configurable circuitry such as an application specific integrated circuit (ASIC) or a field programmable gate array (FPGA).

A learning procedure for learning a signal can be carried out as below. Herein, the signal which is generated through the learning procedure can refer to a digital filter or other discrete time sequence. The signal can be used to generate a sound signal or it can be used for computation purposes for processing a digitized version of a received sound signal.

Learning is done by capturing the step response of the channel under controlled condition, for example at zero flow. This can be done by using one or more pulse as a transmit signal, which is transmitted through the channel. Herein, "channel" refers to a communication channel, which comprises the fluid.

The step response is then processed as follows:

In case of PWM generated signal the step response is time reverted and digitized such that the PWM transmit signal corresponds to the time-reversed step response.

In case of a pulse train input, the step response of the channel is stored in a digital receive filter following the analog-to-digital conversion.

A measuring phase can then be carried out as follows:

In case a PWM-signal is used, the time reversed channel impulse response as derived through the learning process is used as a transmit signal by providing the time reversed digital signal as input to a PWM-device and connecting an output of the PWM-device to an ultrasonic transducer.

In case a pulse train is used, the same signal as used during the learning phase can be used as a transmit signal or measuring signal in the measuring phase. For example, a step signal or a single pulse or a pulse train can be used as transmit signal or as measuring signal. In one example, the pulse train has 10 to 30 pulses. The measuring signal can alternatively be longer or shorter as compared to the learning phase.

In case a PWM-signal is used as a transmit signal, the transmit signal folds with the channel impulse response and a distinct peak is received at the input of the ADC. In other words, in the approximation of an LTI-system (Linear Time Invariant-system), the received response signal is a convolution of the transmit signal with the previously determined impulse response of the channel.

The received signal is digitized and the peak of the signal is for example used to derive the travel time information. This can either be done through a high-resolution sampling process or alternatively, through interpolation of the received signal. The mentioned signal peak detection belongs to PWM, the peaks only appears right after the ADC, if the correlation process takes place in the channel.

The peak can also be calculated after the ADC if the stored inverse filter is correlated with the receive filter.

In case a pulse train is used as a transmit signal we explain the signal processing may be carried out by a DTRAF or a DTRAC method according to the present invention. The DTRAC method can provide an improved power efficiency as compared to the DTRAF method. One reason for the improved efficiency is that DTRAF method filters the whole received signals with FIR-filters. DTRAC method, on the other hand, does not do this power consuming operation, instead it correlates digitized measurement signals directly.

In the DTRAF case the received signal is filtered with the inverse of the response of the channel which has previously been stored, typically in a finite impulse response filter, after the learning phase. As a result of this filtering operation, a distinct peak is obtained. This operation can be done for the upstream as well as for the downstream signals. The resulting signals are then cross-correlated and interpolated.

Secondly, in the DTRAC case the ADC signals of the measurement process are cross-correlated with the training signals and then interpolated. This can again be done for upstream and downstream signals, such that a travel time difference $\Delta T$ between the upstream and downstream signals can be calculated.

BRIEF DESCRIPTION OF THE DRAWINGS

The subject matter of the present specification is now explained in more detail with respect to several figures, wherein.

DETAILED DESCRIPTION OF THE PREFERRED EMBODIMENTS

In the following description, details are provided to describe the embodiments of the present invention. It shall be apparent to one skilled in the art, however, that the embodiments may be practised without such details.

Some parts of the embodiments, which are shown in the Figures, have similar parts. The similar parts have the same names or similar part numbers with a prime symbol or with an alphabetic symbol. The description of such similar parts also applies by reference to other similar parts, where appropriate, thereby reducing repetition of text without limiting the disclosure.

Figure 1:
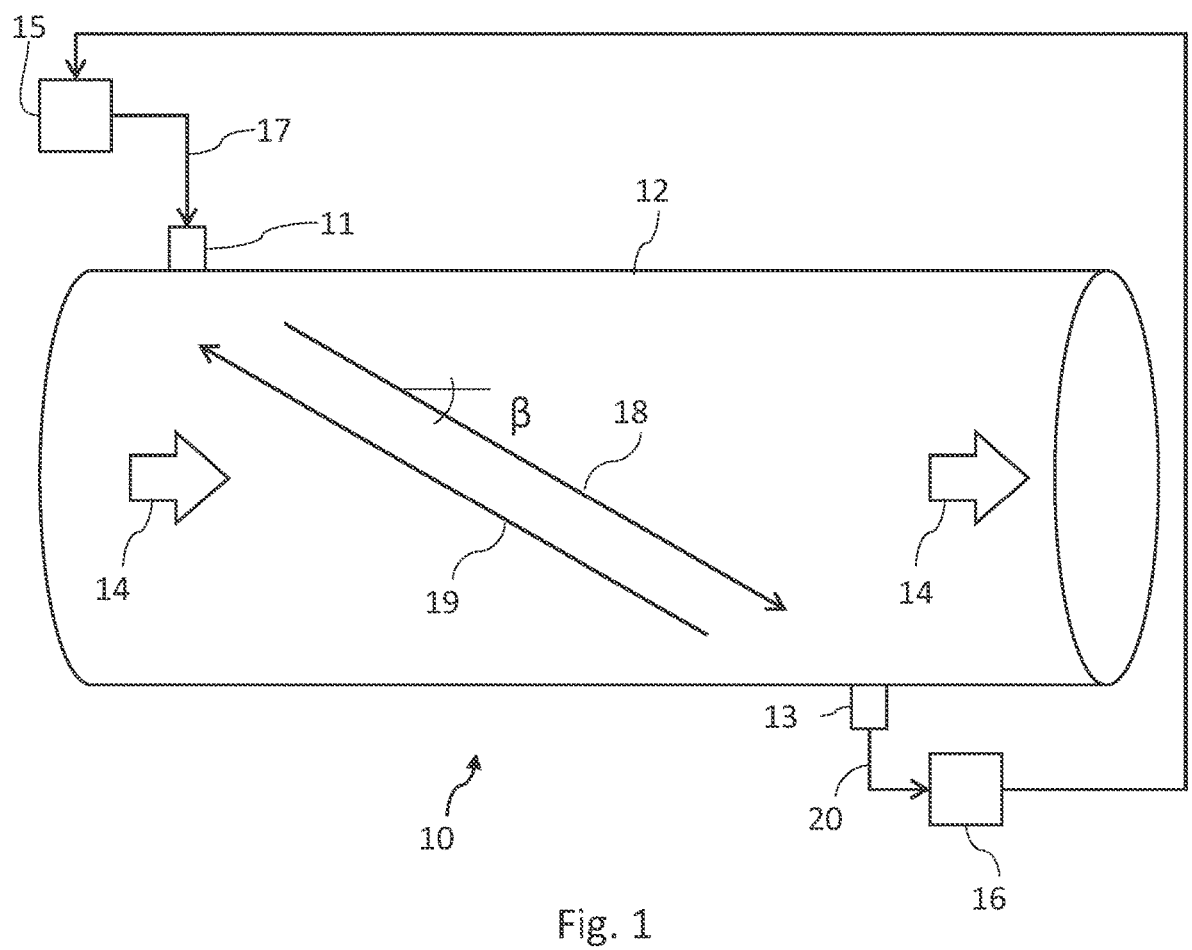
FIG. 1 shows a first flow meter arrangement with two piezoelectric elements.

FIG. 1 shows a first flow meter arrangement 10. In the flow meter arrangement, a first piezoelectric element 11 is placed at an outer wall of a pipe 12, which is also referred as a tube 12. A second piezoelectric element 13 is placed at an opposite side of the pipe 12 such that a direct line between the piezoelectric element 11 and the downstream piezoelectric element 13 is oriented at an angle β to the direction 14 of average flow, which is at the same time also the direction of the pipe's 12 symmetry axis. The angle β is chosen to be approximately 45 degrees in the example of FIG. 1 but it may also be steeper, such as for example 60 degrees, or shallower, such as for example 30 degrees.

A piezoelectric element, such as the piezoelectric elements 11, 13 of FIG. 1 may in general be operated as an acoustic transmitter and as an acoustic sensor. An acoustic transmitter and an acoustic sensor may be provided by the same piezoelectric element or by different regions of the same piezoelectric element. In this case, a piezoelectric element or transducer is also referred to as piezoelectric transmitter when it is operated as transmitter or sound source and it is also referred to as acoustic sensor or receiver when it is operated as acoustic sensor.

When a flow direction is as shown in FIG. 1, the first piezoelectric element 11 is also referred to as "upstream" piezoelectric element and the second piezoelectric element 13 is also referred to as "downstream" piezoelectric element. A flow meter according to the present specification works for both directions of flow in essentially the same way and the flow direction of FIG. 1 is only provided by way of example.

FIG. 1 shows a flow of electric signals of FIG. 1 for a configuration in which the upstream piezoelectric element 11 is operated as a piezoelectric transducer and the downstream piezoelectric element 13 is operated as an acoustic sensor. For the purpose of clarity, the application works upstream and downstream, i.e. the positions of the piezoelectric elements can be interchanged.

A first computation unit 15 is connected to the upstream piezoelectric element 11 and a second computation unit 16 is connected to the downstream piezoelectric element 13. The first computation unit 15 comprises a first digital signal processor, a first digital buffer and a first analog digital converter (ADC). Likewise, the second computation unit 16 comprises a second digital signal processor, a second digital buffer and a second analog digital converter (ADC). The first computation unit 15 is connected to the second computation unit 16.

The arrangement with two computation units 15, 16 shown in FIG. 1 is only provided by way of example. Other embodiments may have different numbers and arrangements of computation units. For example, there may be only one central computation unit or there may be two ADC or buffer units and one central computation unit, or there may be two small-scale computation units at the transducers and one larger central computation unit.

A computation unit or computation units can be provided by microcontrollers or application specific integrated circuits (ASICs), or field programmable gate arrays (FPGAs), for example.

A method for executing a measuring process according to the present invention comprises the following steps:

A pre-determined digital measuring signal is generated by synthesizing an electric signal with the digital signal processor of the first computation unit 15. The electric signal is sent from the first computation unit 15 to the piezoelectric transducer 11 along signal path 17. The piezoelectric transducer 11 generates a corresponding ultrasonic test signal. Units 15 and 16 can also be provided in one single unit.

The measuring signal is provided as an arbitrary waveform. For example, the arbitrary waveform may be provided by a pulse-width modulated oscillation with a base frequency in the MHz range, such as a 1 MHz oscillation. The arbitrary waveform may also represent as a unity impulse.

The ultrasonic test signal travels through the fluid (e.g. liquid) in the pipe 12 to the piezoelectric sensor 13. In FIG. 1, a direct signal path of the ultrasound signal is indicated by an arrow 18. Likewise, a direct signal path of the ultrasonic signal in the reverse direction is indicated by an arrow 19. A response signal is picked up by the piezoelectric sensor 13, sent to the second computation unit 16 along signal path 20, and digitized by the second computation unit 16.

In a further step, a digital measuring signal is derived from the digitized response signal by way of signal processing. According to further embodiments, the derivation of the measuring signal comprises further processing steps.

In a flow meter according to one embodiment of the present specification, the same measuring signal is used for both directions 18, 19, the downstream and the upstream direction, providing a simple and efficient arrangement. According to other embodiments, different measuring signals are used for both directions. In particular, the measuring signal may be applied to the original receiver of the test signal. Such arrangements may provide benefits for asymmetric conditions and pipe shapes.

The operation of the flow meter is now explained in further detail with respect to the FIG. 1.

The ultrasound-measuring signal travels through the liquid in the pipe 12 to the piezoelectric sensor 13. A response signal is picked up by the piezoelectric sensor 13, sent to the second computation unit 16 along signal path 20, and digitized by the second computation unit 16.

A similar process is carried out for a signal travelling in the reverse direction 19, namely the abovementioned measuring signal is applied to the downstream piezoelectric element 13, and a response signal is measured by the upstream piezoelectric element 11 to obtain an upstream time of flight TOFup in the reverse direction 19. The first computation unit 15 determines a velocity of flow, for example according to the formula $$v = \frac{c^2}{2 \cdot L \cdot \cos(\beta)} \cdot (TOF_{up} - TOF_{down})$$

wherein L is the length of the direct path between the piezoelectric elements 11, 13, β is the angle of inclination of the direct path between the piezoelectric elements 11, 13 and the direction of the average flow, and c is the velocity of sound in the liquid under the given pressure and temperature conditions.

The upstream time of flight is given by $$TOF_{up} = \frac{L \cdot \cos(\beta)}{c - v}$$

and the downstream time of flight is given by $$TOF_{down} = \frac{L \cdot \cos(\beta)}{c + v}$$

which leads to the formula $$v = \frac{L \cdot \cos(\beta)}{2} \cdot \frac{TOF_{up} - TOF_{down}}{TOF_{up} \cdot TOF_{down}}$$

By using this formula, it is not necessary to determine temperature or pressure, which in turn determine the fluid density and the sound velocity, or to measure the sound velocity or the fluid density directly. By contrast, the first order of the error does not cancel out for only one measurement direction.

Instead of using a factor of L times cos(beta), a flow dependent value can be derived from calibration measurements with known flow speed. These calibration values take into account further effects such as flow profiles and contributions from sound waves that were scattered and did not travel along a straight line.

According to yet another embodiment, the measuring signal, which is to be supplied to a transmitting piezoelectric element, is synthesized using an arbitrary signal form.

According to a further embodiment of the present specification, the time of flight of a signal is evaluated using a cross-correlation technique. In particular, the respective time shifts can be evaluated by cross correlating the received downstream or upstream signal with the received signal at zero flow speed according to the formula:

$$CCorr(\tau) = \sum_{t=-\infty}^{\infty} Sig_{NoFlow}(t) \cdot Sig_{Flow}(t + \tau)$$

wherein t and τ are time variables, $Sig_{Flow}$ represents an upstream or downstream signal under measurement conditions, when there is a fluid flow through the pipe, and wherein $Sig_{NoFlow}$ represents a signal under calibration conditions at zero flow. The infinite sum limits represent a sufficiently large time window [−T1, +T2] from time T1 to time T2. In more general words, −T1 and +T2 do not need to be same and for practical reasons this can be advantageous for the flow meter.

The time shift TOFup-TOFdown is then obtained by comparing the time of the maximum of the upstream correlation function with the time of the maximum of the downstream correlation function. The envelope of the correlation function may be used to determine the location of the maximum more accurately.

In a further embodiment, a separate evaluation unit is provided between the first computation unit 15 and the second computation unit 16, which performs the calculation of the signal arrival times and the flow speed.

In general, the measured signal of the acoustic sensor results from a superposition of scattered signals and a direct signal. The scattered signals are reflected from the inner and outer walls of the pipe once or multiple times including additional scattering processes within the pipe wall. This is shown, by way of example, in FIG. 2.

The time of arrival can also be determined by using a matched filter technique. According to a simple model, which is based on the assumptions of straight signal propagation and mirror-like reflections on the conduit walls, the received response signal can be modelled as $$x(t) = A * s(t - TOA) + n(t)$$

where t is a time variable, A is an attenuation factor, s is the emitted signal that is time shifted by the unknown time of arrival TOA and n(t) is a noise term. The time of arrival TOA is then derived by correlating the received signal x(t) with the time shifted measuring signal s(t) according to $$y(t) = \text{Integral}(-\inf, \inf, x(r)s(t - \tau))$$

wherein −inf, inf are integration boundaries minus infinity and plus infinity and the convolution x(τ)s(t−τ) is a function which is integrated with respect to the time variable τ.

The time of arrival is the time value or function argument for which the correlation becomes a maximum $$TOA = \arg\max[y(t)]$$

The abovementioned correlation can also be expressed in terms of a convolution with a "matched filter" h(t) that takes the form $$h(t) = a \cdot s(t_0 - t),$$

wherein a is a normalization factor and s(t) is the measuring signal. This procedure can be generalized to the case of multiple receivers as follows. A set of phase shifts is determined which maximizes the sum of the response signal amplitudes of the individual receiving transducers. A time of arrival is determined by applying a matched filter to the sum function of the individual received response signals shifted by the previously determined set of phase shifts.

The transducer configuration of FIG. 1 is a direct-line. Other arrangements, which make use of reflections on an opposite side of the pipe, are possible as well, such as the "V" and the "W" configuration. V and W configuration work based on reflections on the pipe wall, which induce more scatterings than the straight line configuration. The subject matter of the application will benefit from these configurations as long as the paths are understood properly.

In a V-configuration, the two transducers are mounted on the same side of the pipe. For recording a 45-degree reflection, they are placed about a pipe diameter apart in the direction of the flow. The W-configuration makes use of three reflections. Similar to the V-configuration, the two transducers are mounted on the same side of the pipe. For recording a signal after two 45-degree reflections, they are placed two pipe diameters apart in the direction of the flow.

Figure 2:
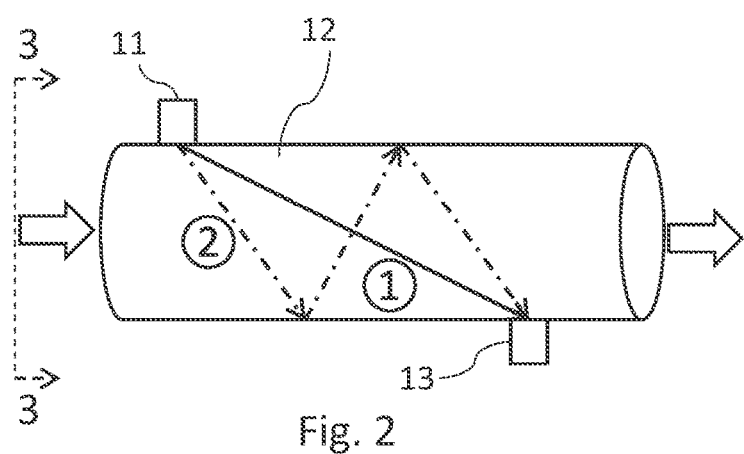
FIG. 2 shows the flow meter arrangement of FIG. 1, one direct signal and two scattered signals.

FIG. 2 shows, by way of example a first acoustic signal "1", which travels directly from the piezoelectric element 11 to the piezoelectric element 13, and a second acoustic signal "2", which is scattered twice at the periphery of the pipe 12.

Figure 3:
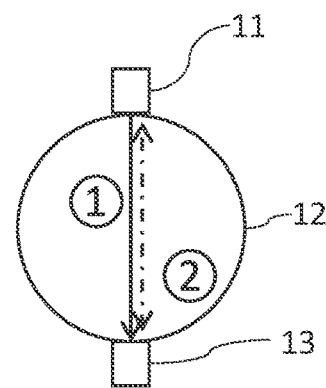
FIG. 3 shows the flow meter arrangement of FIG. 1 when viewed in the direction of flow.

For the sake of simplicity, the scattering events are shown as reflections in FIGS. 2 to 5 but the actual scattering process can be more complicated. In particular, the most relevant scattering occurs typically in the pipe wall or at material that is mounted in front of the piezoelectric transducers. FIG. 3 shows a view of FIG. 2 in flow direction in the viewing direction 3-3.

Figure 4:
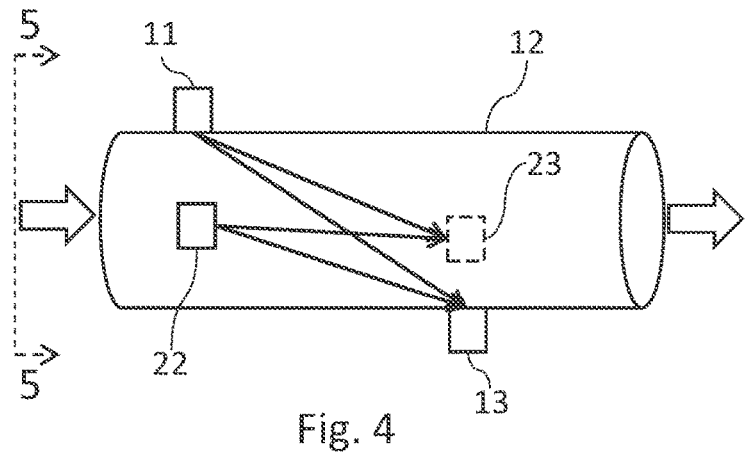
FIG. 4 shows a second flow meter arrangement with four piezoelectric elements and four direct signals.
Figure 5:
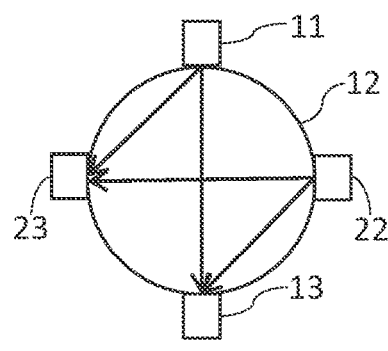
FIG. 5 shows the flow meter arrangement of FIG. 4 when viewed in the direction of flow.

FIGS. 4 and 5 show a second sensor arrangement in which a further piezoelectric element 22 is positioned at a 45-degree angle to the piezoelectric element 11 and a further piezoelectric element 23 is positioned at a 45-degree angle to the piezoelectric element 13.

Furthermore, FIGS. 4 and 5 show direct or straight-line acoustic signal paths for a situation in which the piezoelectric elements 11, 22 are operated as piezo transducers and the piezoelectric elements 13, 23 are operated as acoustic sensors. Piezoelectric element 23, which is on the back of the pipe 12 in the view of FIG. 4 is shown by a dashed line in FIG. 4.

FIGS. 6 to 9 show, by way of example, different arrangements of clamp-on piezoelectric transducers for which a flow measurement according to the present specification can be used. By providing multiple sending transducers with signals based on arbitrary waveforms, it is possible to obtain an improved signal at a receiving transducer, for example a signal improved beam shaping properties. By providing multiple receiving transducers, a received measuring signal can be evaluated more efficiently and/or a greater design freedom for the arbitrary shaped measuring signals can be achieved.

FIGS. 6 to 9 are aligned, such that a gravity force on a liquid in the pipe 12 points downwards. However, arrangements, which are rotated relative to the arrangements of FIGS. 6 to 9, may also be used. The viewing direction of FIGS. 6 to 9 is along the longitudinal axis of the pipe 12. An upstream or downstream position of a transducer is not indicated in FIGS. 6 to 9.

Figure 6:
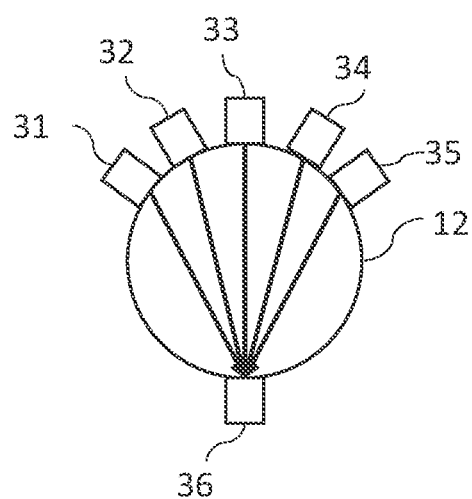
FIG. 6 shows a many-to-one sensor arrangement for a flow measurement according to the present invention.

In the arrangement of FIG. 6, an array of five piezoelectric elements 31-35 is provided in a first location and a further piezoelectric element 36 is placed upstream or downstream of the first location. The array of piezoelectric elements 31-35 may be used to obtain a pre-determined wave front and to achieve an improved focusing of an acoustic wave in a pre-determined direction, when the array of five elements 31-35 is used as a transmitter and the further element 36 is used as a receiver.

Figure 7:
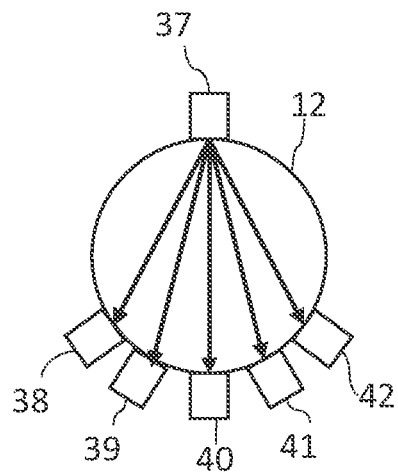
FIG. 7 shows a one-to-many sensor arrangement for a flow measurement according to the present invention.

In the arrangement of FIG. 7, a single piezoelectric element 37 is provided in a first location and an array of five piezoelectric elements 38-42 is placed upstream or downstream of the first location. The array of piezoelectric elements 38-42 may be used to obtain an improved recording of the wave front of the response signal. The improved recording can then be used to obtain an improved flow-measuring signal, which is then applied to the single piezoelectric element 37.

Figure 8:
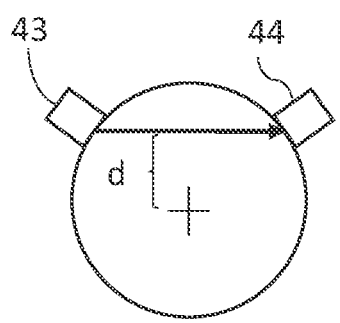
FIG. 8 shows a one-to-one sensor arrangement for a flow measurement in a layer according to the present invention.

FIG. 8 shows an arrangement of two piezoelectric elements 43, 44 wherein one element is placed downstream with respect to the other. A distance d of the connection line between the piezoelectric elements 43, 44 to the symmetry axis of the pipe 12 is about half the radius of the pipe 12, such that a flow layer at a distance d to the central axis of the pipe 12 can be measured.

Especially for clamp-on transducers, such as the piezoelectric elements 43, 44 shown in FIG. 8, the flow measurement according to the present specification provides an improved signal at the receiving piezoelectric element 44, 43 through beam forming.

Figure 9:
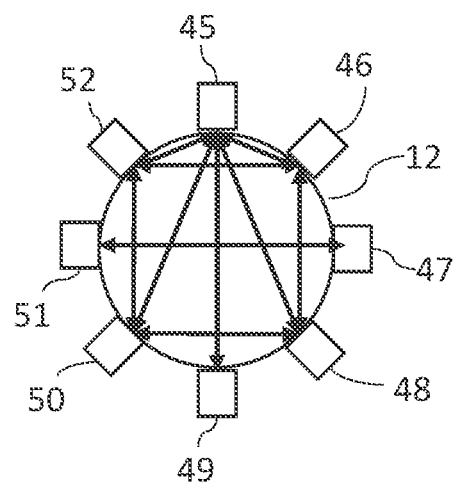
FIG. 9 shows a multi-sensor arrangement for flow measurement in multiple layers according to the present invention.

FIG. 9 shows an arrangement of eight piezoelectric elements 45-52, which are spaced at 45 degrees apart. Several arrangements are possible with respect to upstream-downstream placements.

In one arrangement, the sensors locations alternate between upstream and downstream along the perimeter, for example 45, 47, 49, 51 upstream and 46, 48, 50, 52 downstream.

In another arrangement, first four consecutive elements, such as 45-48, along the perimeter are placed upstream or downstream relative to the other four elements, such as 49-52. In a further arrangement with 16 piezoelectric elements, all the piezoelectric elements 45-52 of FIG. 9 are placed in one plane and the arrangement of FIG. 9 is repeated in upstream or downstream direction.

In the arrangements of FIGS. 6 to 9, a receiving transducer is offset relative to a sending transducer with respect to a longitudinal direction of a conduit or a flow direction. Specifically, the transducer 36 of FIG. 6 is offset with respect to transducers 31 to 35, the transducer 37 of FIG. 7 is offset with respect to transducers 38 to 42, the transducer 44 of FIG. 8 is offset with respect to transducer 43 and in FIG. 9 opposite transducers are offset relative to each other in the longitudinal direction of the conduit. For example, transducer 51 is offset with respect to transducer 47 and transducer 52 is offset with respect to transducer 46.

Figure 10:
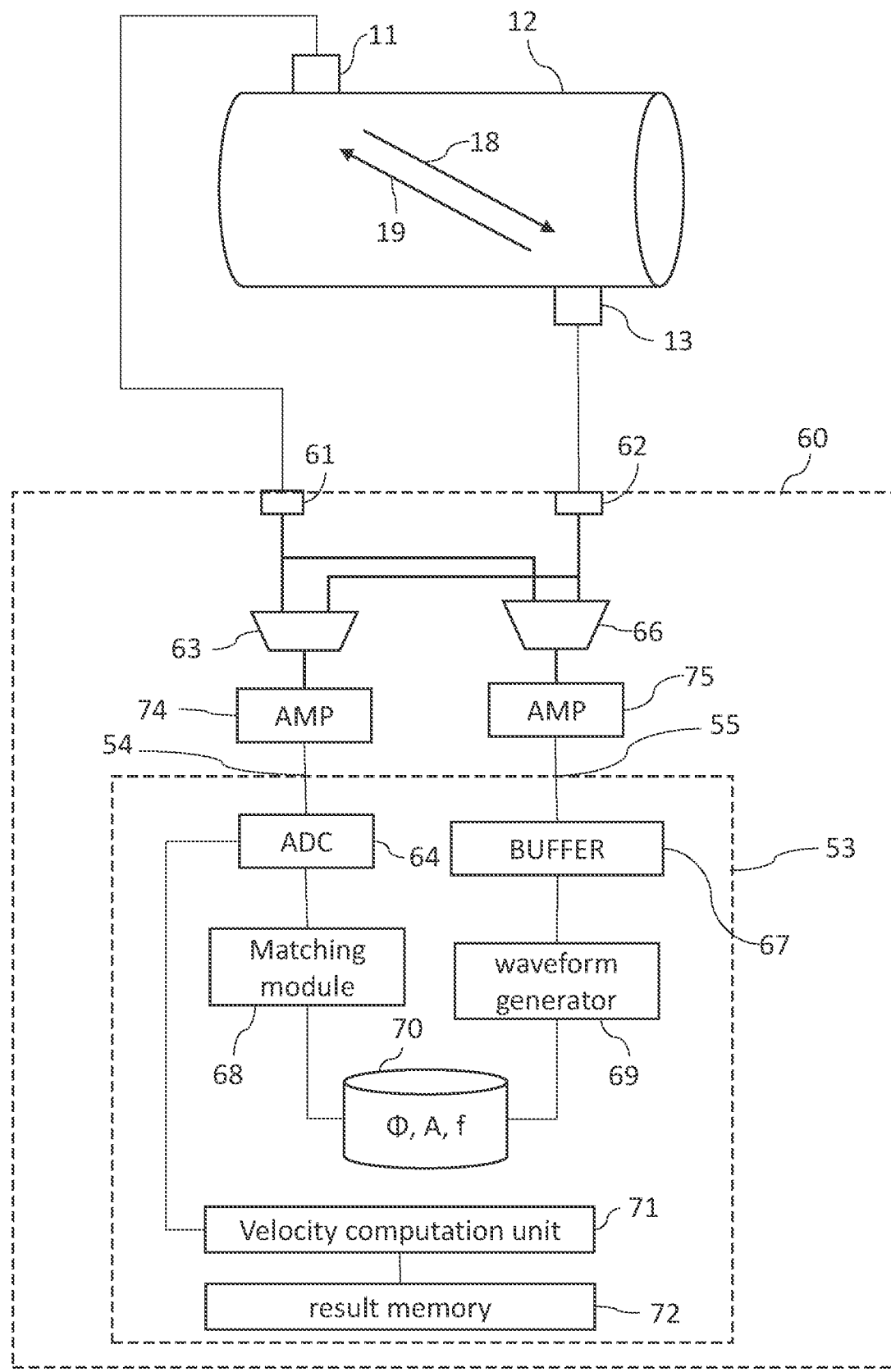
FIG. 10 shows a device for measuring a flow speed according to the present invention.

FIG. 10 shows, by way of example, a flow measurement device 60 for measuring a flow in the arrangement in FIG. 1 or other arrangements according to the present invention. In the arrangement of FIG. 1, the flow measurement device 60 is provided by the first and second computation units 15, and 16 (not shown in FIG. 10).

A first connector 61 of the flow measurement device 60 is connected to a first piezoelectric transducer 11 at a fluid conduit 12, and a second connector 62 of the flow measurement device is connected to a second piezoelectric transducer 13 at the fluid conduit 12.

Inside the flow measurement device 60, the first connector 61 is connected to an analog-to-digital converter 64 over a multiplexer 63 and a first amplifier 74. The second connector 62 is connected to a digital buffer 67 over a second amplifier 75 and a demultiplexer 66.

The buffer 67 is connected to a waveform generator 69, which is connected to a waveform database 70. The waveform database 70 is connected to the ADC 64 over a matching module 68, wherein the matching module 68 is foreseen to match parameters to specific circumstances of the conduit 12 under test. The ADC 64 is furthermore connected to a velocity computation unit 71, which is connected to a result memory 72.

During a signal-generating phase, the waveform generator 69 retrieves waveform parameters from the waveform database 70, derives an electric signal from the retrieved waveform parameters and sends the signal to the digital buffer 67.

More specifically, the flow measurement device 60 can be provided with an electronic processing unit 53 in the form of a microcontroller or an FPGA that comprises—among others—several ADCs 64 with a high resolution, a digital correlator (not shown in FIG. 10) and a module which supports signal envelope detection. In the transmitting direction, flow measurement device 60 generates digital signals with variable frequency. In the case of a square wave signal, the duty cycle of the signal can be altered by modulating the pulse width of the square wave signal which is also known as PWM.

The ADC 64, the matching module 68, the waveform database 70, the waveform generator 69, the buffer 67 are provided e.g. on the electronic processing unit 53, e.g. a microcontroller or a microprocessor. Among others, the electronic processing unit 53 has a connector pin 54 for connecting the first amplifier 74, a connector pin 55 for connecting the second amplifier 75, a connector pin (not shown) for connecting a supply battery (not shown), and a connector pin (not shown) for connecting a ground potential (not shown).

Further components which are not shown in FIG. 10, such as an electric power converter, can be provided between the supply battery and a connector pin.

In an alternative embodiment it is possible to measure a "current fingerprint" of the electronic processing unit 53, when executing the proposed methods. It has been found out, that a calculation part of the methods is not in the peek (which would be a distinct current fingerprint) but rather in flat regions following the peek.

The flow measurement device 60 can transmit signals with a pre-determined frequency and amplitude. These signals are output with the digital buffer 67. Alternatively, the output can be provided by a component that converts the pre-determined output signal into a PWM-signal.

The device of FIG. 10 is shown by way of illustration. A device for carrying out a flow measurement according to the present specification can comprise more or less components than shown in FIG. 10. In particular, the digital signals according to the below mentioned DTRAF- and DTRAC-methods can be generated by an adjustable pulse generator unit 76 and do not require a matching module 68, and/or a waveform database 70 and/or a waveform generator 69.

In the case of a PWM generated time inverted signal, functionality is provided to invert a received response signal, or a portion of the received response signal, with respect to time and to send the inverted signal as an input signal to the pulse width modulator.

Figure 11:
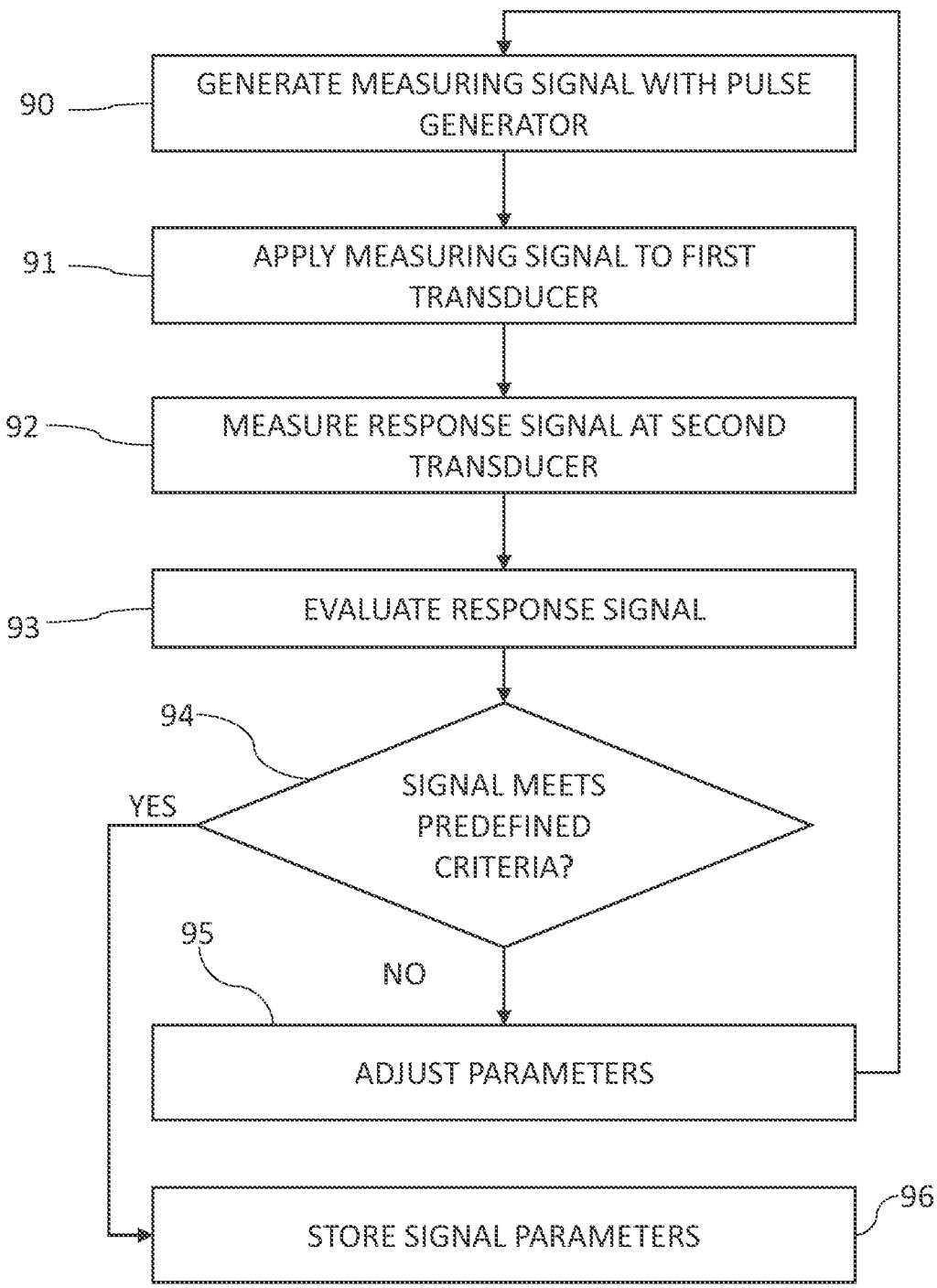
FIG. 11 illustrates an iterative procedure for deriving a waveform for use in the flow meter of FIG. 10.
Figure 12:
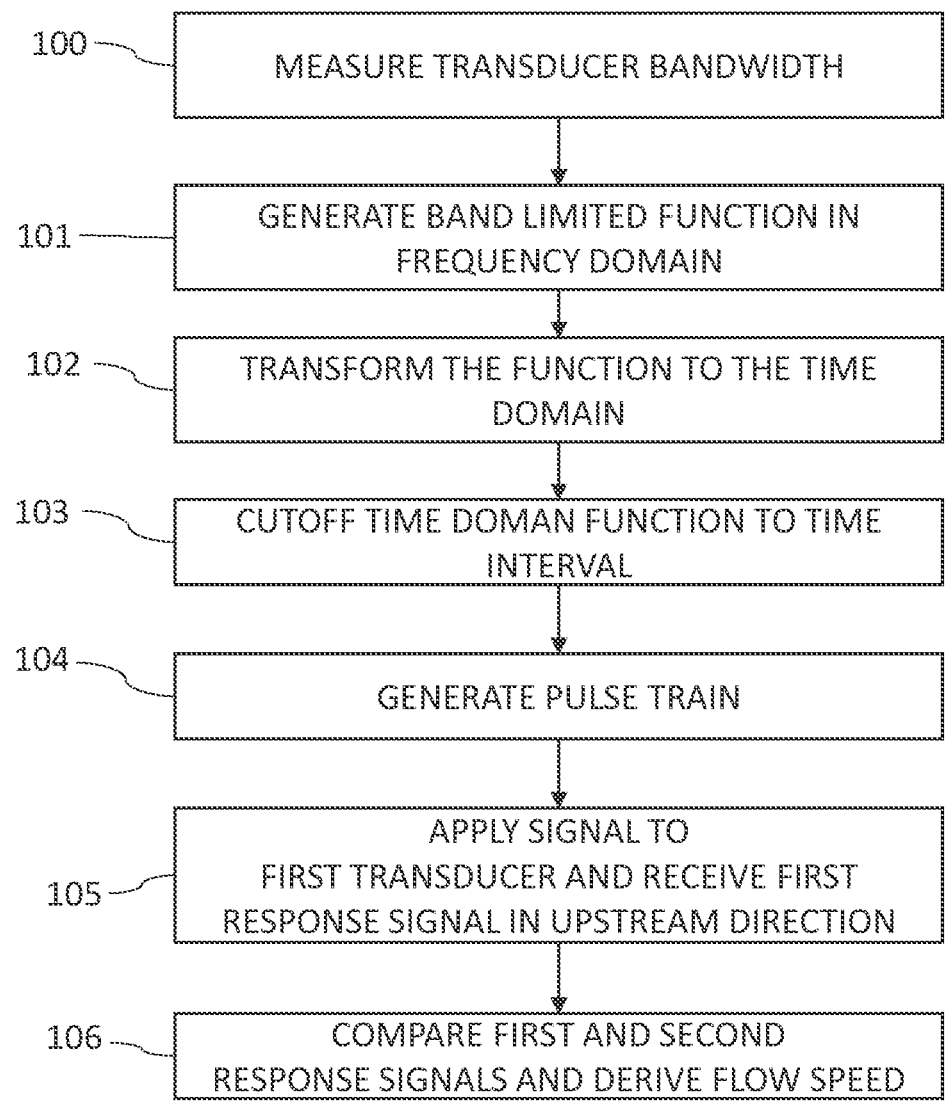
FIG. 12 illustrates a further procedure for deriving a waveform for use in the flow meter of FIG. 10.
Figure 13:
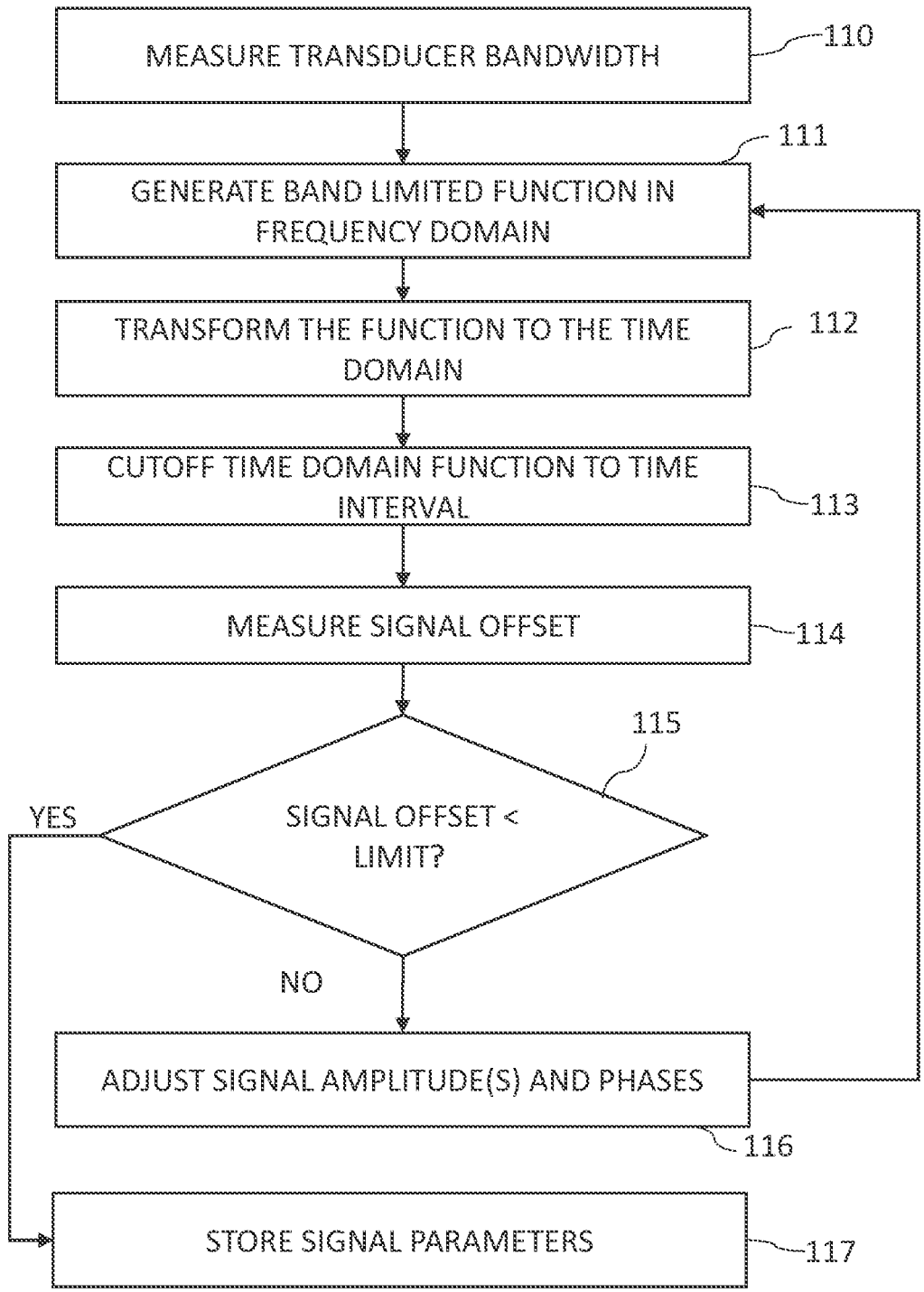
FIG. 13 illustrates a further procedure for deriving a waveform for use in the flow meter of FIG. 10.

The procedures of the following FIGS. 11 to 13 can be used to generate specially adapted digital output signals for use in a measurement according to the invention. Among others, phase and amplitude of the digital signal can be varied.

FIG. 11 illustrates an iterative procedure for generating an ultrasound output signal that meets predefined criteria.

In a first step 80, a measuring signal is generated with a pulse generator. In a second step 81, the measuring signal is applied to a first transducer 11. A response signal is measured at the second transducer 13 in step 82.

In a further step 83, the response signal is evaluated according to predetermined criteria. For example, the response signal can be matched with a predetermined wave form. If it is determined in step 84, that the response signal meets the predetermined criteria, parameters of the measuring signal are determined and are stored in step 86, preferably in the waveform database 70 for later usage.

Otherwise, the frequency, amplitude and/or phase of the measuring signal or also other signal parameters are adjusted in step 85 and the procedure loops back to the first step 80 in which a predetermined measuring signal is generated.

This iterative method can also be applied to a multiple transducer arrangement. In the case of multiple sending transducers, the individual frequencies, amplitudes or phases of the respective measuring signals are adjusted. In the case of multiple receiving transducer, the criteria are applied to the response signals that are received at the receiving transducers.

FIG. 12 shows a further method of deriving an arbitrary waveform signal, which comprises the following steps:

In a step 90, a transducer band width is measured. In one example, the transducer bandwidth is approximately 300 kHz around a transducer center frequency of approximately 1 MHz. One example of a signal which makes good use of this transducer bandwidth is a signal, which has a rectangular band width of 300 kHz in the frequency domain.

A bandlimited function, such as a rectangular signal is generated in the frequency domain. A corresponding signal or function in the time domain is obtained in step 92 by applying the reverse Fourier transform, which yields a sinc-like function.

The sinc-like function is then truncated to a suitable signal length, which does not have too much signal power but enough information in step 93. The signal is then used as input signal for a pulse generator or a pulse width modulation in step 94 in order to generate a pulse train.

The resulting signal is used as a measuring signal in upstream and downstream directions in steps 95 and 96.

FIG. 13 shows a further method of deriving a measuring signal. The method of FIG. 13 is a variation of the method of FIG. 12. For the sake of brevity, similar steps are not explained again. According to the method of FIG. 13, the function or waveform is adjusted, such that there is no offset at zero flow of the fluid.

In a step 105 it is tested whether a signal time offset is below a predetermined threshold. If the offset is below the predetermined threshold, signal parameters are stored in a step 107. Otherwise, the procedure loops back to step 101.

A further method (not shown in figures) is explained below:

1) A time of flight difference ΔT is obtained from the difference of upstream and downstream measurements.

2) The signal frequency is adjusted. After that, the procedure loops back to 1) and the amplitude and phase of the time domain signal is changed until there is zero offset, which implies, that a time difference of zero is measured for zero fluid flow.

3) Alternatively, the signal under 1) is generated with a correction step 2). A pre-distortion is applied to the signal according to predetermined criteria. The pre-distortion can be chosen, such that the receiver can be designed in a way that is suitable for a specific received response signal. For example, the signals under 1) and 2) can be pre-distorted such that the zero crossings at the receiver appear at equidistant time intervals. Thereby, a narrow bandwidth receiver can be used. This applies to time of flight and TRA-measurements.

In steps 1-3 an arbitrary digital waveform is used instead of just an oscillation with a rectangular envelope. The abovementioned procedure and the procedures of FIGS. 11 to 13 can be used for all digital time-of-flight and time reversal acoustics systems.

In the following, flow measurements using a DTRAF-method, using a DTRAC-method and using a time reversed signal that is applied to a pulse width modulation are explained in more detail.

Digital TRA-Filtering (DTRAF) is a digital version of the known TRA-method. A basic concept of DTRAF is to not send a time reversed signal and instead replace it with a digital filter operation but it is also possible to send the time reversed signal in conjunction with DTRAF (or DTRAC) without changing the underlying principles. Consequently, the DTRAF training process produces a digital FIR-filter, wherein the TRA-method is digitally executed. This simplifies electronics in terms of the removal of the TDC and lower specifications on the DAC, for example with respect to accuracy and electric power consumption. By contrast, the ADC is an important component. In the end, interpolation of the processed signals increases the accuracy from the sampling period into the picoseconds region.

Figure 19:
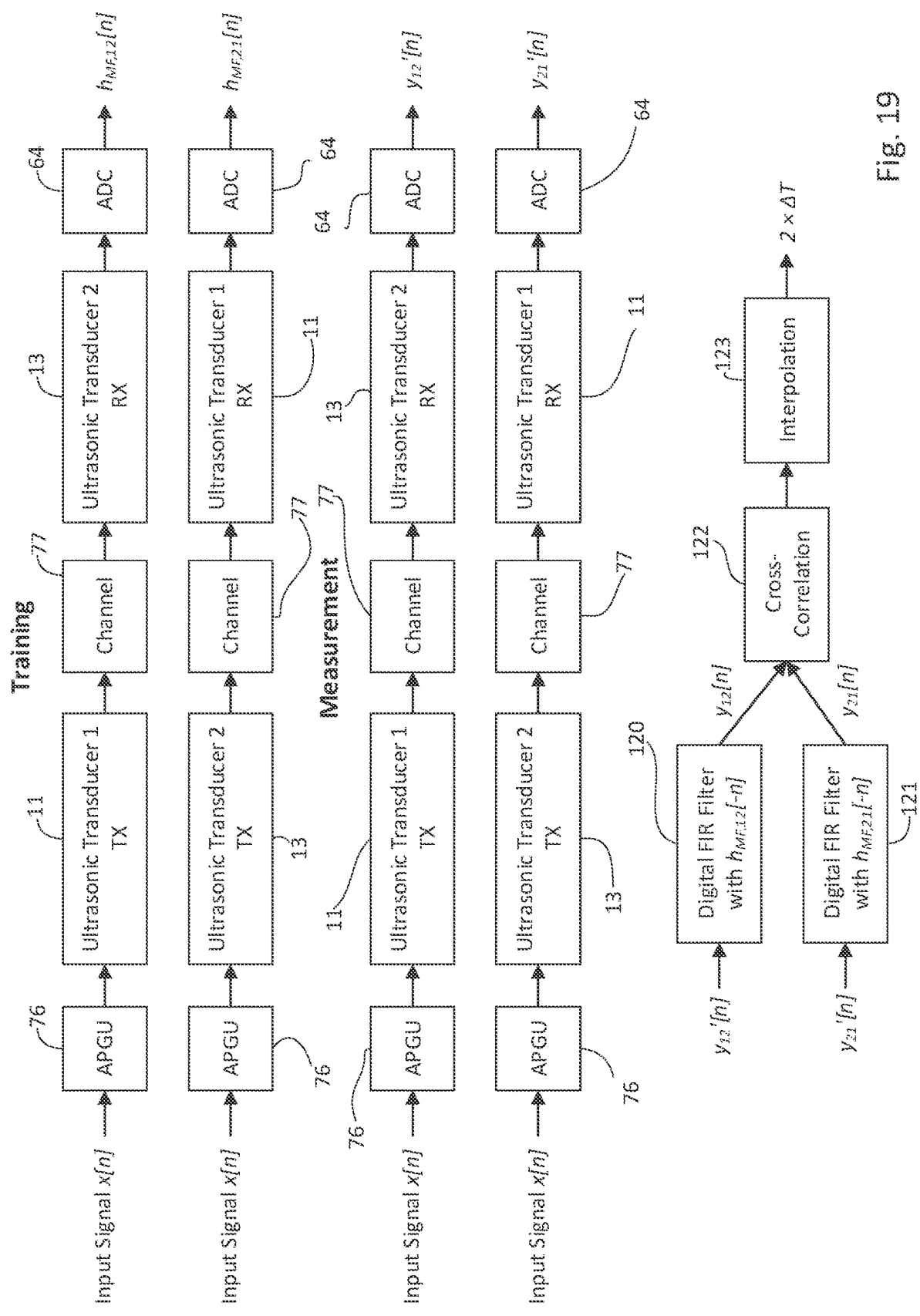
FIG. 19 shows a visualization of the DTRAF-method as a block diagram.

The proposed DTRAF-method is illustrated in FIG. 19 in block diagram form.

In the arrangement of FIG. 19, the digital buffer 67 of the arrangement of FIG. 10 is replaced with an adjustable pulse generator unit (APGU) 76. The method is now explained in more detail:

Firstly, the TRA training process for the flow measurement device 60 is done either with a high precision or with the on-board ADC. The output of the training is a digital FIR filter. The system gets excited by an input signal x[n] in a training mode:

$$h_{MF,12}(t)=h_{12}*x(t) \to h_{MF,12}[n]=Q(h_{MF,12}(n \cdot T_s)), \quad (1)$$

$$h_{MF,21}(t)=h_{21}*x(t) \to h_{MF,21}[n]=Q(h_{MF,21}(n \cdot T_s)), \quad (2)$$

with $T_s$ as the sampling period. This sampling period has to match the sampling period of the later measurements. In case a faster ADC was used, the digital filter needs to be resampled to the sampling period of the measurement mode.

In a measurement mode, the system is again excited with the input signal x[n]:

$$y_{12}'(t)=h_{12}(t)*x(t) \to y_{12}'[n]=Q(y_{12}'(n \cdot T_s)), \quad (3)$$

$$y_{21}'(t)=h_{21}(t)*x(t) \to y_{21}'[n]=Q(y_{21}'(n \cdot T_s)), \quad (4)$$

$y_{12}'[n]$ and $y_{21}'[n]$ are the digitized measurement signals. Here and in the following, the variable in square brackets denotes a discrete time index, which corresponds to n times the sampling time Ts in case of a uniform sampling that begins at time t=0.

In the next step, these digitized measurement signals are convolved with the time-reversed trained digital filters:

$$y_{12}[n]=h_{MF,12}[-n]*y_{12}'[n], \quad (5)$$

$$y_{12}[n]=h_{MF,12}[-n]*y_{12}'[n], \quad (6)$$

This additional filter operation increases the computational time due to the many multiply and add operations. Note here, that it might be beneficial when instead of two different trained digital filter units 120, 121, the same digital filter units in both convolutions is used. The time reversal may be carried out in memory, by storing in reverse order, or also by reading out in reverse order.

Afterwards, these two filtered measurement signals $y_{12}[n]$ and $y_{21}[n]$ are correlated (or matched by any pattern matcher) with each other in a cross correlation unit 122:

$$r[n]=y_{12}[n]*y_{21}[n] \quad (7)$$

It is important to note here that this cross-correlation with cross correlation unit 122 does not need to be fully computed. In particular, the correlation function does not need to be sampled at such a high frequency that the maximum is always close to a sampling time. The cross-correlation is an estimator for time delays and its argument maximum corresponds to the time delay between the two measurement signals:

$$n^*=\arg \max(r[n]), \quad (8)$$

wherein n is a time index and r is the correlation function between the two measurement signals y12[n], y21[n].

The time delay between the upstream and the downstream signal is twice the time delay between signal at zero flow and a signal at the current fluid flow.

However, in order to compute not the whole cross-correlation, it is sufficient to have an estimation where the argument maximum is located. This can be done by estimations of the absolute transit times $T_{abs,12}$ and $T_{abs,21}$. The subtraction of these transit times yields, by definition:

$$2 \cdot \Delta T = T_{abs,12} - T_{abs,21}.$$

With low sampling rates, this is accurately enough to estimate n*:

$$\hat{n}^* = \text{round}\left(\frac{1}{T_s} \cdot (\hat{T}_{abs,12} - \hat{T}_{abs,21})\right), \quad (10)$$

where $\hat{n}^*$ denotes an estimation of n*. In geometric terms, is the lag in integer samples between the two filtered measurement signals $y_{12}[n]$ and $y_{21}[n]$.

Figure 20:
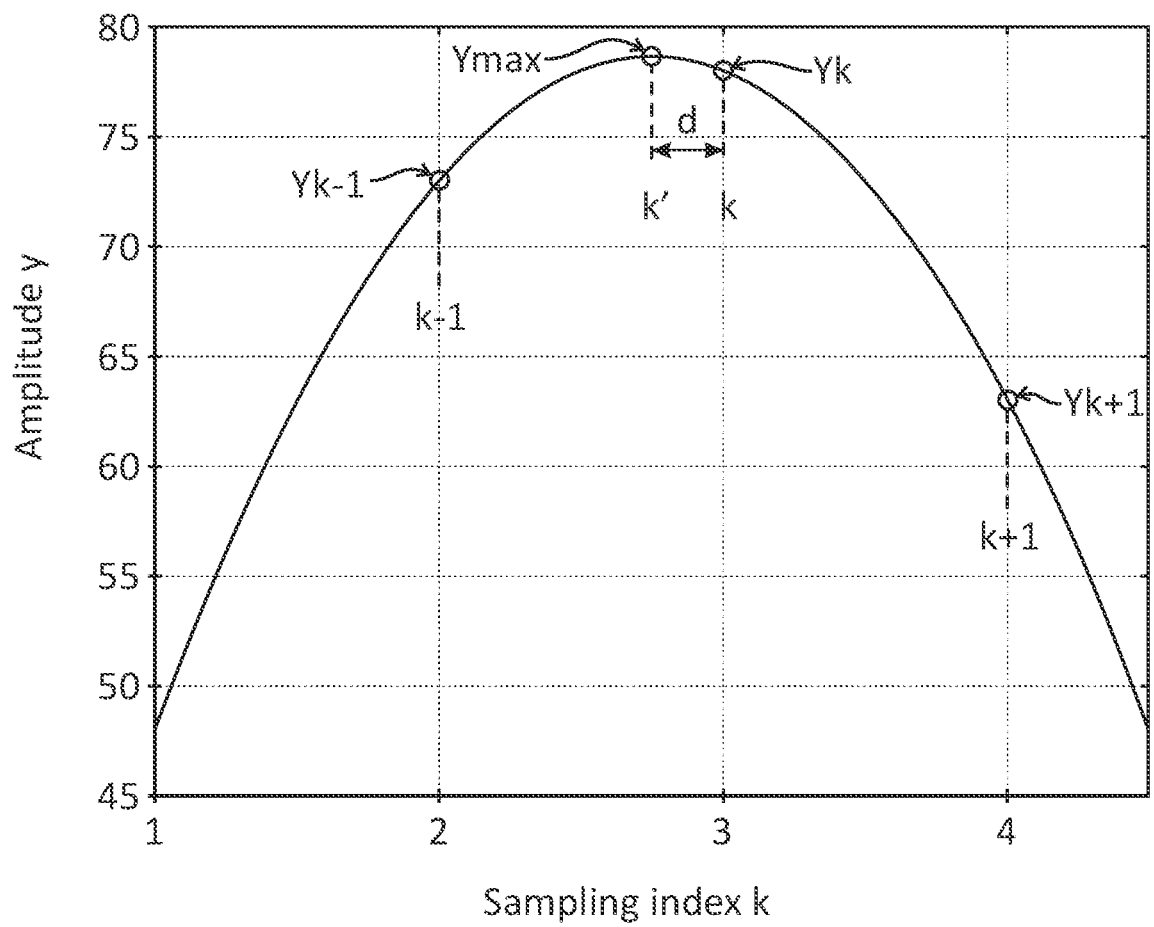
FIG. 20 shows an illustration of a general peak interpolation for determining a maximum of a correlation function.

Finally, only a few points of the cross-correlation (or any pattern matcher) need to be computed around the lag $\hat{n}^*$. The number of points depends on the interpolation method. The interpolation method increases accuracy from the sampling period down to the picoseconds range. As an example, the cosine interpolation (needs three points) works excellent for such small-banded ultrasonic transducer signals with the cross-correlation method. The cosine peak interpolation yields the distance d from lag $\hat{n}^*$ to the hidden maximum of the continuous cosine function. This interpolation is illustrated in FIG. 20.

From F. Viola, W. Walker, "A Spline-Based Algorithm for Continuous Time-Delay Estimation Using Sampled Data", IEEE transactions on ultrasonics, ferroelectrics and frequency control, Vol. 52, No. 1, January 2005 it is known that the cosine peak interpolation of a function y[k] can be calculated in the following way:

$$\alpha = \arccos\left(\frac{y_{k-1} + y_{k+1}}{2 \cdot y_k}\right) \quad (11)$$

$$\beta = \arctan\left(\frac{y_{k-1} - y_{k+1}}{2 \cdot y_k \cdot \sin(\alpha)}\right), \quad (12)$$

$$d = -\frac{\beta}{\alpha}. \quad (13)$$

This d then corrects the lag estimation $\hat{n}^*$ to obtain a highly precise $\Delta T$:

$$\Delta T = \frac{1}{2} \cdot T_s \cdot (\hat{n}^* + d) \quad (14)$$

The multiplication with ½ can be omitted when considered in the final calculation of the flow velocity.

There is a slightly different method compared to DTRAF (Digital TRA-Filtering), called DTRAC (Digital TRA-Correlation). The training and the measurement process to get the trained FIR-filters and the measurement signals are identical to DTRAF. However, the signal processing chain changes. Instead of filtering the whole signal with the (time-reversed) trained FIR-filters, only a few points are calculated by a cross-correlation with the not time-reversed FIR filters. This is done for the up- and the downstream measurement signal.

Through interpolation of these correlation points, precise absolute transit times are obtained and can then be used to calculate the ΔT by subtraction. The DTRAC method is illustrated exemplary in FIG. 21 as a block diagram.

Similar to the DTRAF-method an adjustable pulse generator unit 76 can be used for performing DTRAC. In the following, the proposed DTRAC-method is explained in more detail:

Firstly, the TRA-training is done in the same way as for DTRAF with an input signal x[n], whereas x(t) is the time-continuous form of x[n]:

$$h_{MF,12}=h_{12}(t)*x(t) \rightarrow h_{Mf,12}[n]=Q(h_{Mf,12}(n \cdot T_s)), \quad (15)$$

$$h_{MF,21}=h_{21}(t)*x(t) \rightarrow h_{Mf,21}[n]=Q(h_{Mf,21}(n \cdot T_s)), \quad (16)$$

This yields the FIR filter coefficients $h_{MF,12}[n]$ and $h_{MF,21}[n]$ with $T_s$ as sampling period.

The measurement works the same way as the TRA training did. The same input signal x[n] is used:

$$y_{12}'=h_{12}(t)*x(t) \rightarrow y_{12}'[n]=Q(y_{12}'(n \cdot T_s)), \quad (17)$$

$$y_{21}'=h_{21}(t)*x(t) \rightarrow y_{21}'[n]=Q(y_{21}'(n \cdot T_s)), \quad (18)$$

The measurement signals are quantized and sampled with $T_s$. The measurement signals are then cross-correlated with the digital filters:

$$r_{12}[n]=y_{12}'[n]*h_{MF,12}[n], \quad (19)$$

$$r_{21}[n]=y_{21}'[n]*h_{MF,21}[n], \quad (20)$$

The cross-correlation is an estimator for time delays. However, other time delay estimators (or pattern matchers) could be used as e.g. sum of squared differences (SSD). The two cross-correlations do not need to be fully computed, instead only a few points around the real maximum peak need to be computed. This is sufficient for the calculation of the interpolation method:

$$n_{12}^*=\arg\max(r_{12}[n]), \quad (21)$$

$$n_{21}^*=\arg\max(r_{21}[n]), \quad (22)$$

Or in a more general case, estimations of n* for low sampling rates:

$$\hat{n}_{12}^* = \text{round}\left(\frac{1}{T_s} \cdot \left(\hat{T}_{abs,12} - \hat{T}_{abs,h_{MF,21}}\right)\right), \quad (23)$$

$$\hat{n}_{21}^* = \text{round}\left(\frac{1}{T_s} \cdot \left(\hat{T}_{abs,21} - \hat{T}_{abs,h_{MF,12}}\right)\right). \quad (24)$$

$\hat{n}_{xy}^*$ corresponds to the estimation of n*. A big sampling period is lowering the risk of a wrong $\hat{n}_{12}^*$ or $\hat{n}_{21}^*$ estimation. The interpolation method uses the knowledge of the time-continuous function behind the time-discrete cross-correlation (or any pattern matcher). In the case of narrow banded ultrasonic transducers, the cross-correlation output tends to be very similar to a cosine oscillation around the real maximum peak. This effect can be even greater with an input signal, which excites only the resonance frequency of the ultrasonic transducer pair like a long sine, cosine, triangular or rectangular oscillation. The interpolation method estimates the index of the real maximum of the time-discrete cross-correlation in subsamples (and times with the multiplication of the sampling period):

$$T_{abs,12}=T_s \cdot (\hat{n}_{12}^*+d_{12}), \quad (25)$$

$$T_{abs,21}=T_s \cdot (\hat{n}_{21}^*+d_{21}), \quad (25)$$

$d_{12}$ and $d_{21}$ correspond to the subsample correction of the interpolation method. As the absolute transit times $T_{abs,12}$ and $T_{abs,21}$ are very precise, the ΔT can be obtained through subtraction of these:

$$\Delta T = \frac{1}{2} \cdot (T_{abs,12} - T_{abs,21}). \quad (27)$$

The multiplication with ½ can be omitted when considered in the calculation of the flow velocity.

The proposed DTRAF- and the DTRAC-methods can model the channel 77 with the conduit 12 and the fluid in the computer. This can be explained as follows: if an LTI-system has blocks or transfer functions A, B, C, D, then the resulting transfer function in the frequency domain is the product A*B*C*D of the individual transfer functions A, B, C, D. This product does not depend on the order of the transfer functions A, B, C, D. Therefore, the calculation of the channel response can be "shifted" into the digital domain.

Figure 14:
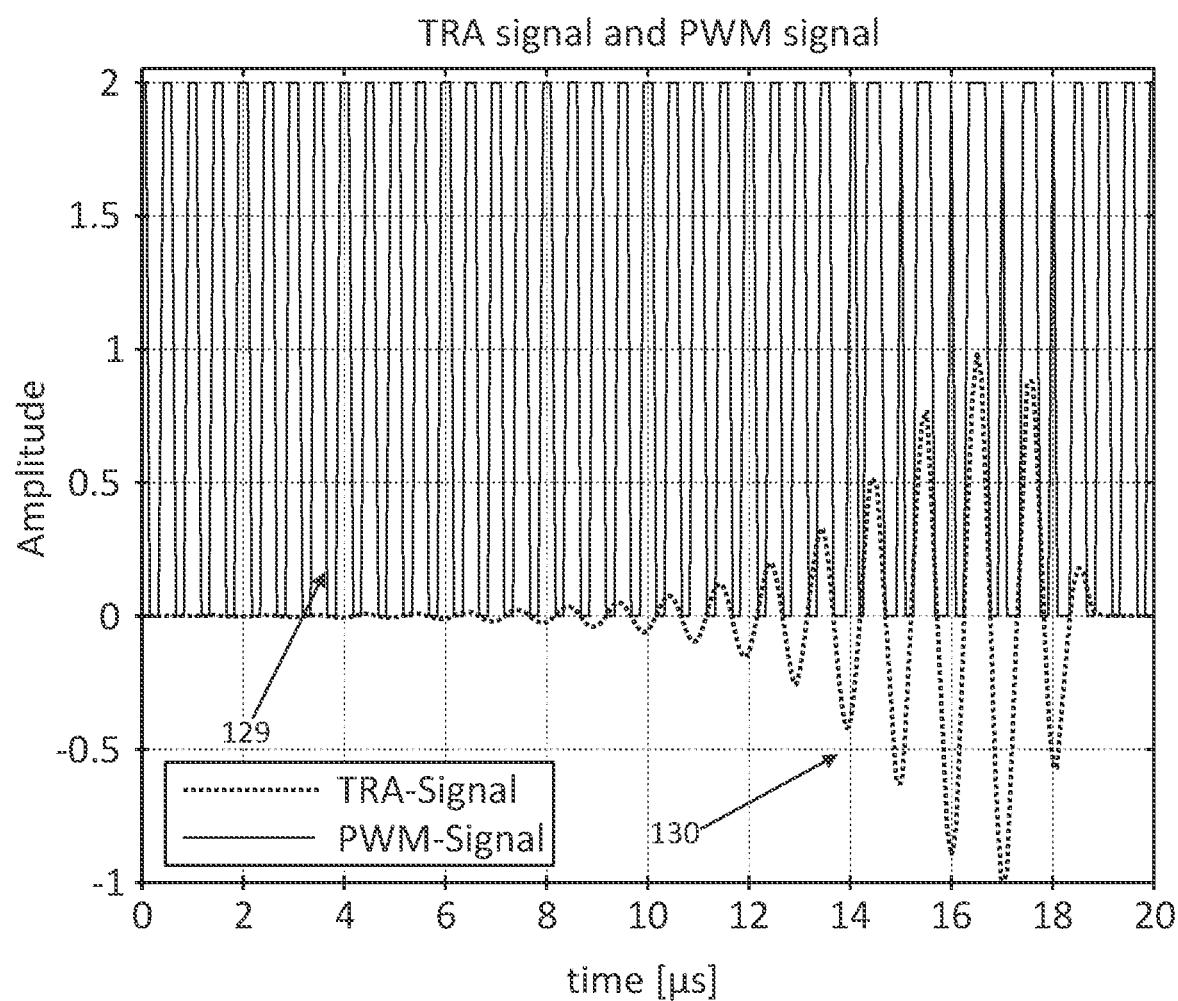
FIG. 14 shows a comparison between a PWM signal of a pulse width modulator, which approximates a time reversed TRA signal, and the time reversed signal.

FIG. 14 shows a PWM-signal 129 of a pulse width modulator, which has a suitable modulated on/off cycle, such that the PWM-signal 129 approximates a time reversed TRA-signal 130.

Figure 15:
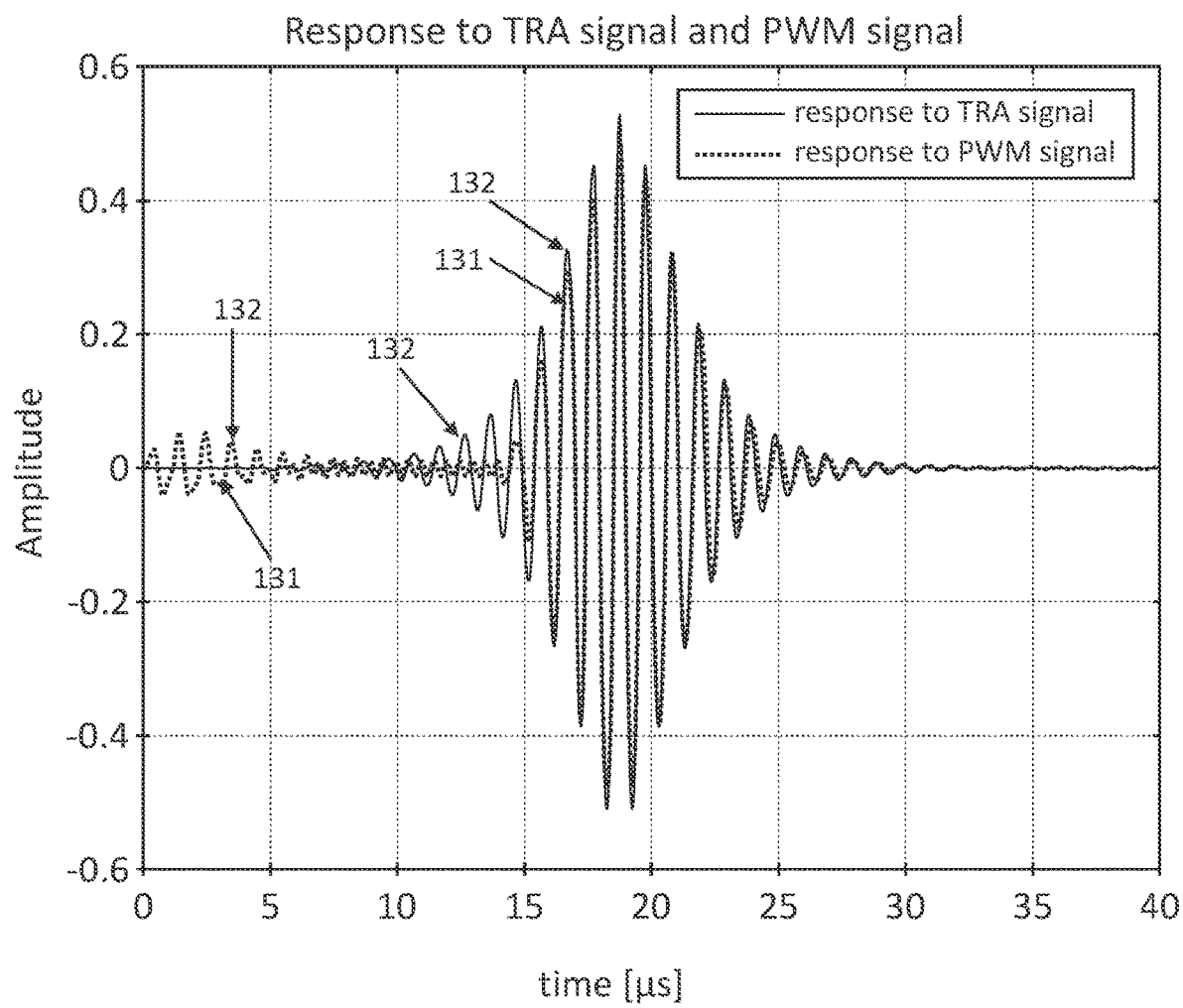
FIG. 15 shows a comparison between a response signal to the PWM signal of FIG. 14 and a response signal to the time reversed signal of FIG. 14.

FIG. 15 shows a comparison of a response signal 131 to the PWM-signal 129 and a response signal 132 to the time reversed TRA-signal 130.

According to the PWM-based TRA-method, a time reversed signal is approximated according to UA=A·sign(UE−UD), where sign(x)=1 for x>=0 and 0 else.

By way of example, the pulse width modulation can be based on an example with a transducer, a triangular signal frequency of 2 MHz and a PWM time resolution of approximately 83 ns.

The approximation of the time inverted signal, which is shown in FIG. 14, is fairly good, even though the PWM-generation is kept simple and no additional filters are used.

Figure 16:
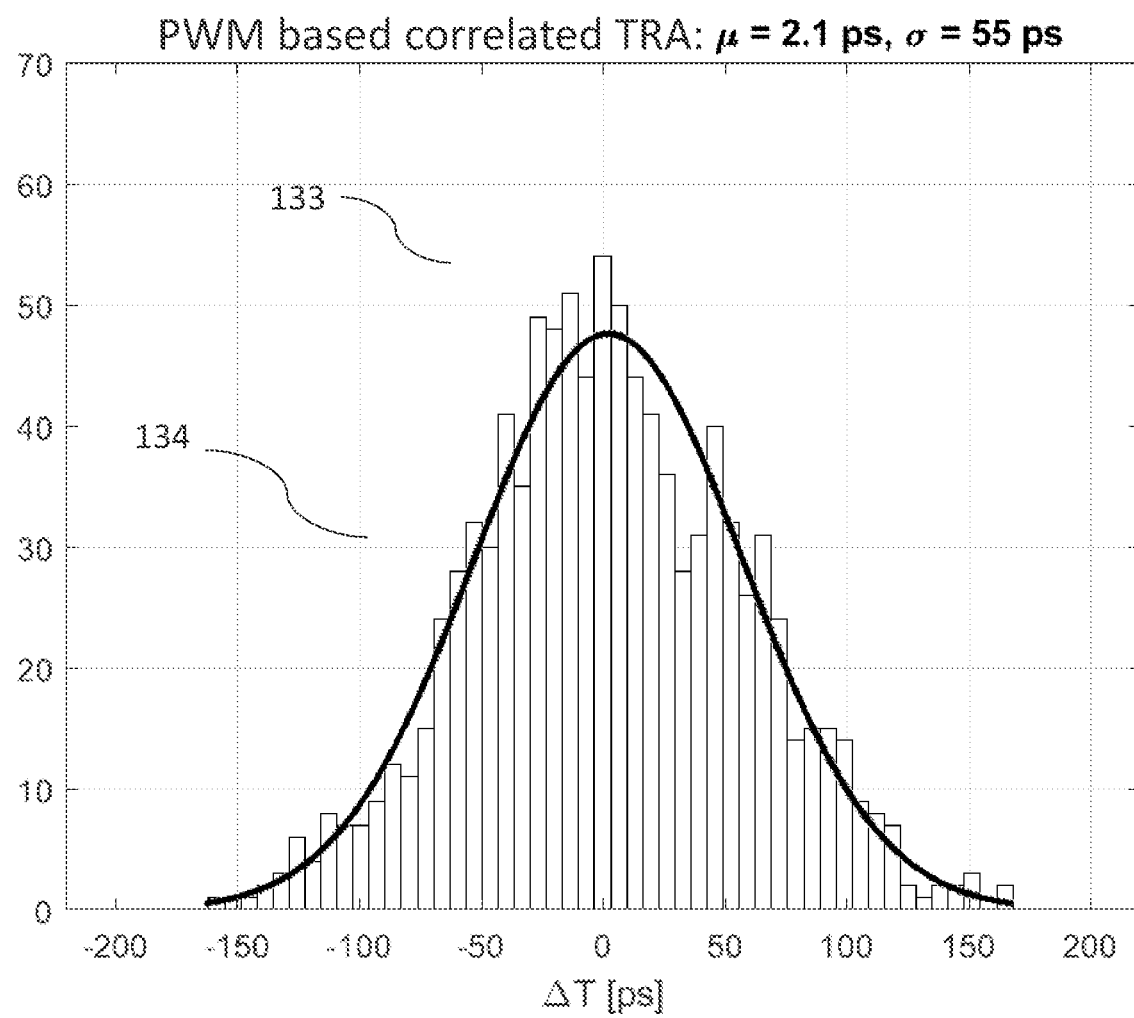
FIG. 16 shows simulation results for a PWM based correlated TRA.

The simulation with PWM based correlated TRA shown in FIG. 16 demonstrates how the performance of the ΔT changes. As for the simulations the signal power is computed and the noise is scaled, in these simulations the SNR for the PWM based correlated TRA must be increased.

Figure 17:
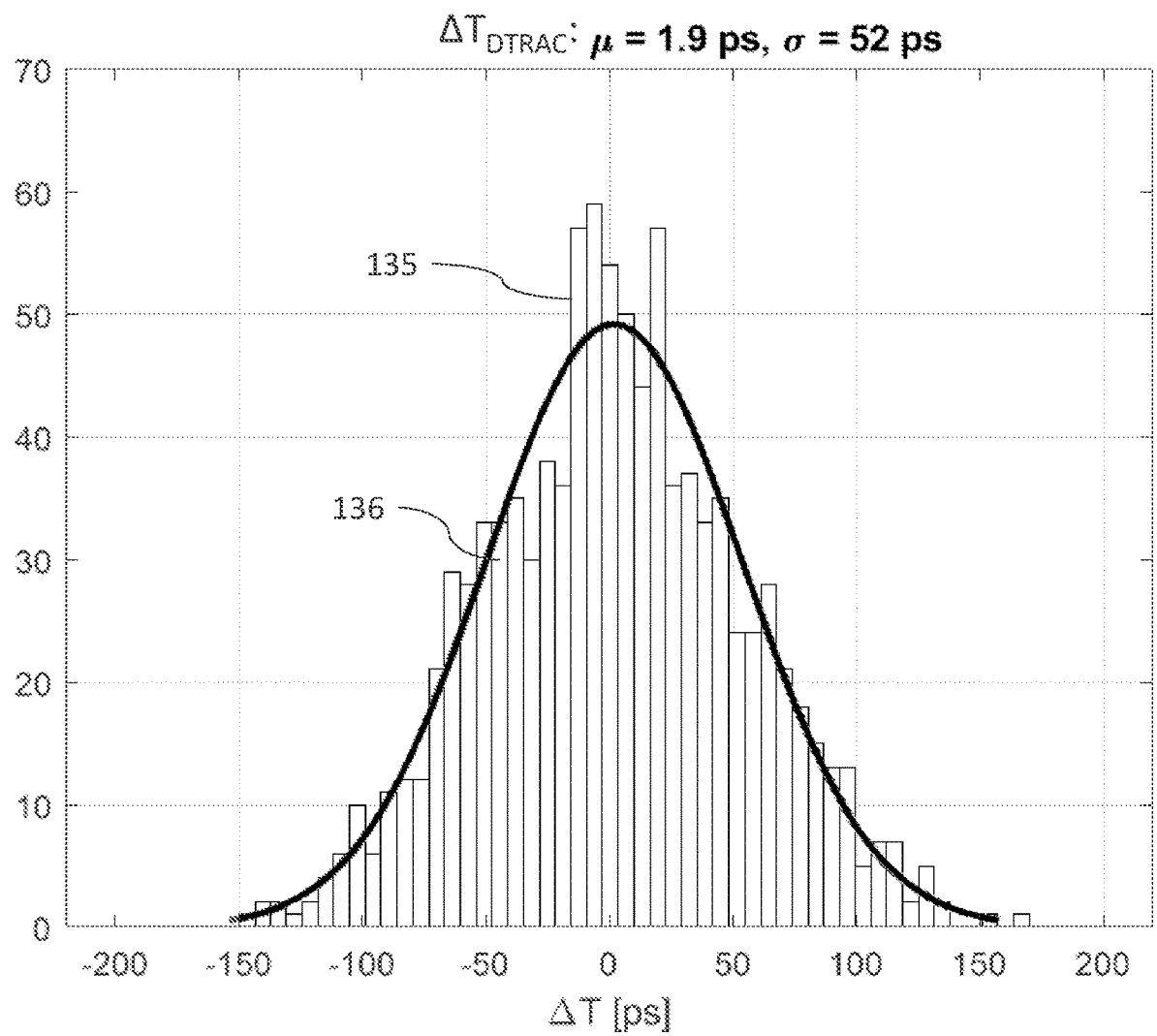
FIG. 17 shows simulation results for signals generated with the digital TRA correlation method shown in FIG. 21.

The results of FIGS. 16 and 17 are obtained by simulations, in which the system including the signal generation, transducers, the channel and the signal reception is modeled as a linear time invariant system. The simulations model measurements with zero flow.

FIG. 16 shows measured time delays for the PWM based correlated TRA. The measured time delays are indicated by the column diagram 133 and a resulting probability density is shown by the Gaussian curve 134.

FIG. 17 shows measurement results for signals generated with the abovementioned digital TRA correlation method. The measured time delays are indicated by the column diagram 135 and a resulting probability density is shown by the Gaussian curve 136.

Figure 18:
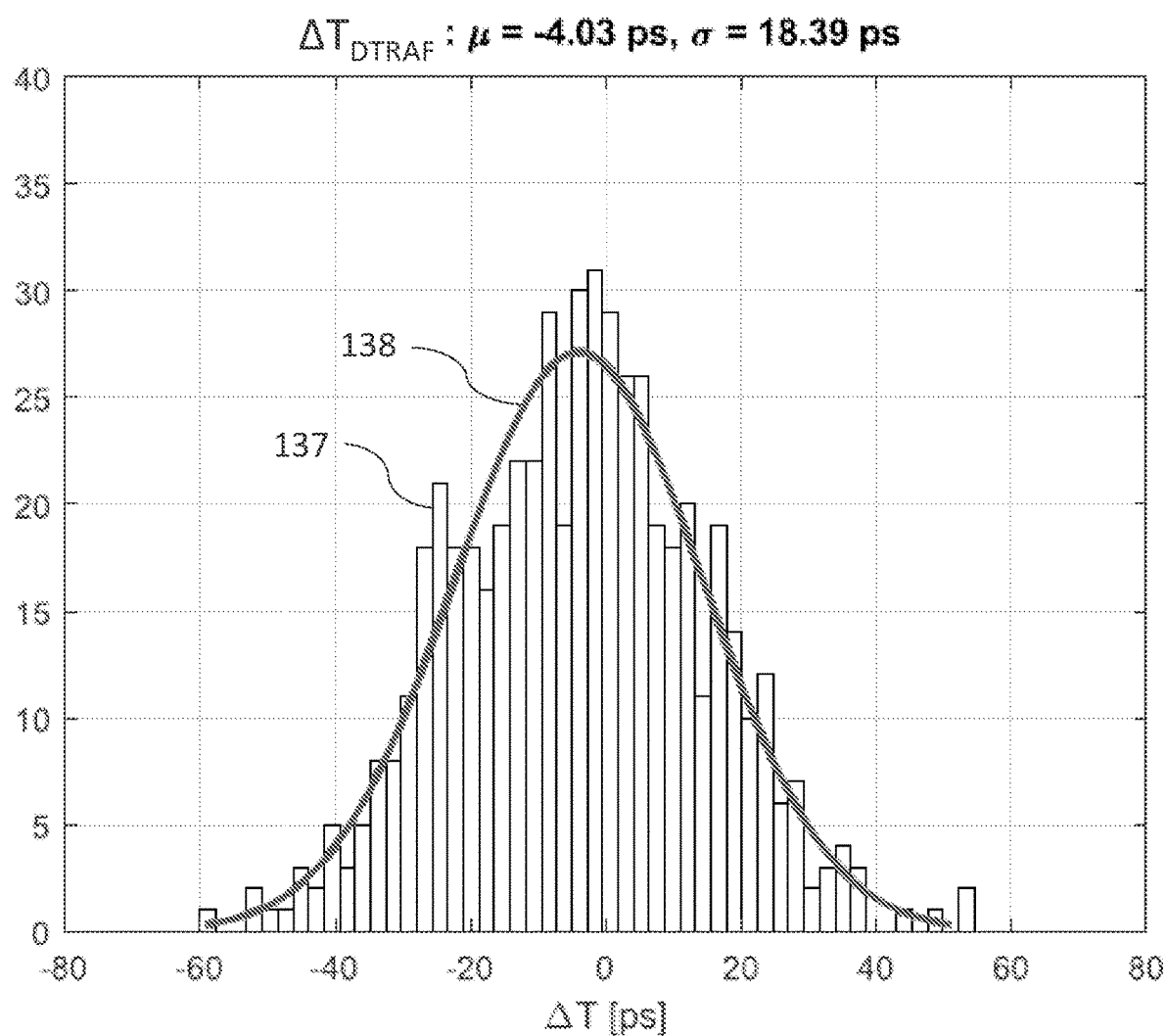
FIG. 18 shows simulation results for signals generated with the digital TRA filtering method shown in FIG. 19.

FIG. 18 shows measurement results for signals generated with the abovementioned digital TRA filtering method. The measured time delays are indicated by the column diagram 135 and a resulting probability density is shown by the Gaussian curve 136.

A comparison between the methods yields relatively similar results (e.g. with respect to mean, standard deviation). Note that simulation parameters used to generate measurement results shown in FIGS. 16, 17 and 18 are differentiated.

For the measurement of FIG. 18, pulse trains with 25 pulses are used as an input signal. The first 50 measurements of the TRA training are averaged and stored in two FIR-filters. ΔT_DTRAF is the result of the digital TRA filtering method (DTRAF). The test tube has closed ends for making zero flow measurements.

FIG. 19 shows a visualisation of the DTRAF-method as a block diagram. Herein, an adjustable pulse generator unit 76 is connected to an input signal source on an input side and to a first ultrasonic transducer 11 on an output side. The first ultrasonic transducer 11 is coupled to a channel 77, such as a conduit 12 with a fluid. A second ultrasonic transducer 13 is coupled to the channel 77 and an output of the second ultrasonic transducer 13 is coupled to an ADC 64. The same arrangement is also used during the measurement phase, which is shown in FIG. 19 below the training phase.

The bottom row shows a signal evaluation of a digitized received response signal during a measurement phase. A first digital filter unit 120 and a second digital filter unit 121 are respectively connected to an output of the ADC 64. Respective outputs of the digital filter units 120, 121 are connected to an input of a cross-correlation unit 122 and an output of the cross-correlation unit 122 is connected to an input of an interpolation unit 123.

FIG. 20 shows an illustration of a general peak interpolation for determining a maximum of a correlation function. The general peak interpolation according to FIG. 20 has been explained further above and is not repeated in detail here. In short, a correlation function is locally approximated by a cosine function or a higher order polynomial. This cosine is found through interpolation with three interpolation points y[k−1], y[k] and y[k+1]. Then, the maximum of the cosine function is determined. If there are more interpolation points available, a least square method could be used to find the cosine. The distance of the interpolation points to the cosine can also be minimized according to a different kind of norm.

Figure 21:
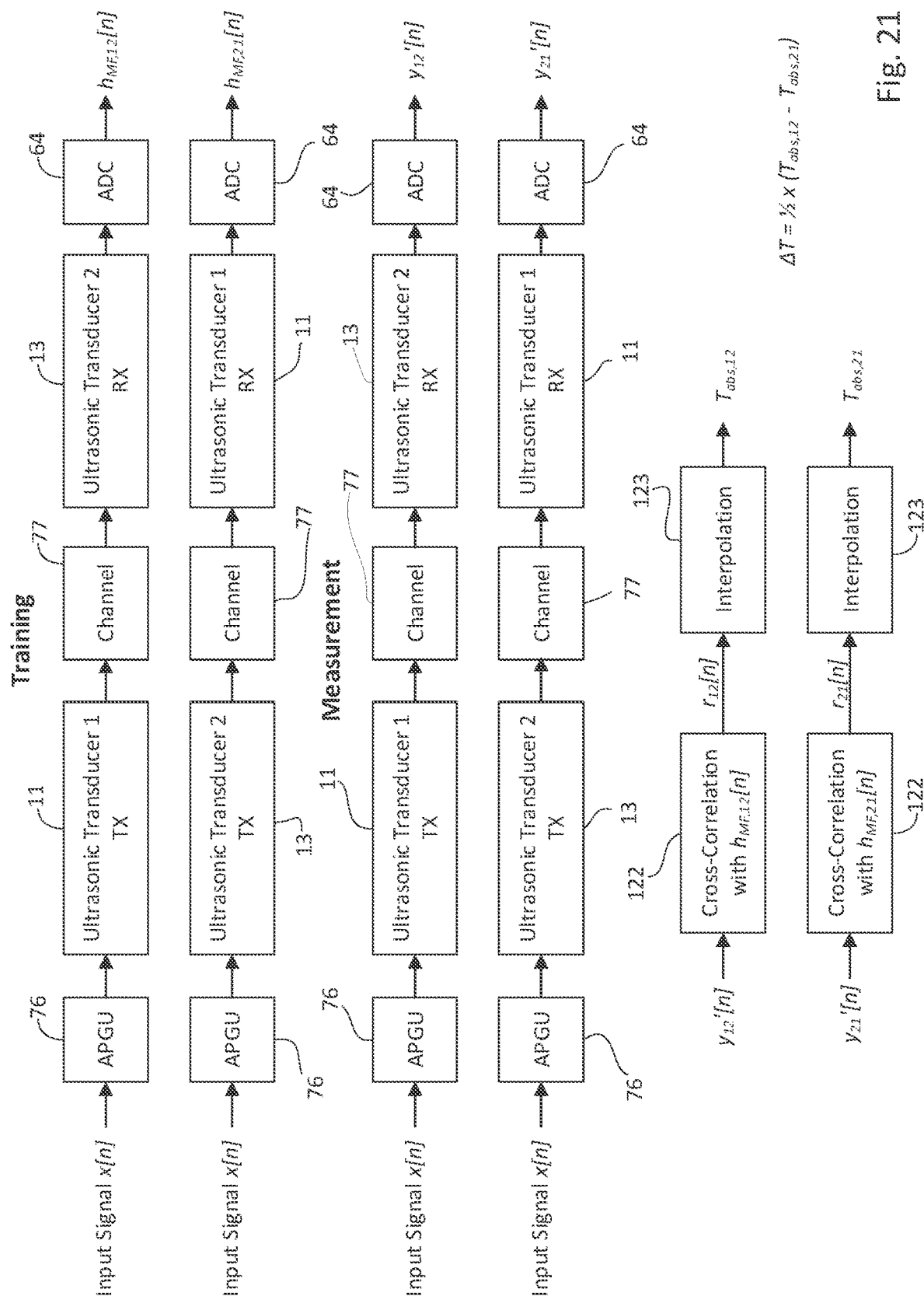
FIG. 21 shows a visualization of the DTRAC-method as a block diagram.

FIG. 21 shows a visualisation of the proposed DTRAC-method as a block diagram. The arrangement of FIG. 21 is similar to the arrangement of FIG. 19. For the sake of brevity, only the components in the bottom row, which are different from those of FIG. 19 are explained below.

An input of a cross correlation unit 122 is connected to an output of the ADC 64 and an output of the cross-correlation unit 122 is connected to an input of an interpolation unit 123.

FIGS. 19 and 21 can also be seen as a possible realization of the DTRAC and DTRAF-methods by hardware and/or software components. The various units shown in FIGS. 19 and 21 can be realized by separate components or on one component and they can be realized in hardware and/or in software. For example, the cross-correlation unit 122 and the interpolation unit 123 can be realized on the same integrated circuit. The training and measurement procedures according to FIGS. 19 to 21 have been explained further above and are not repeated here.

Figure 22:
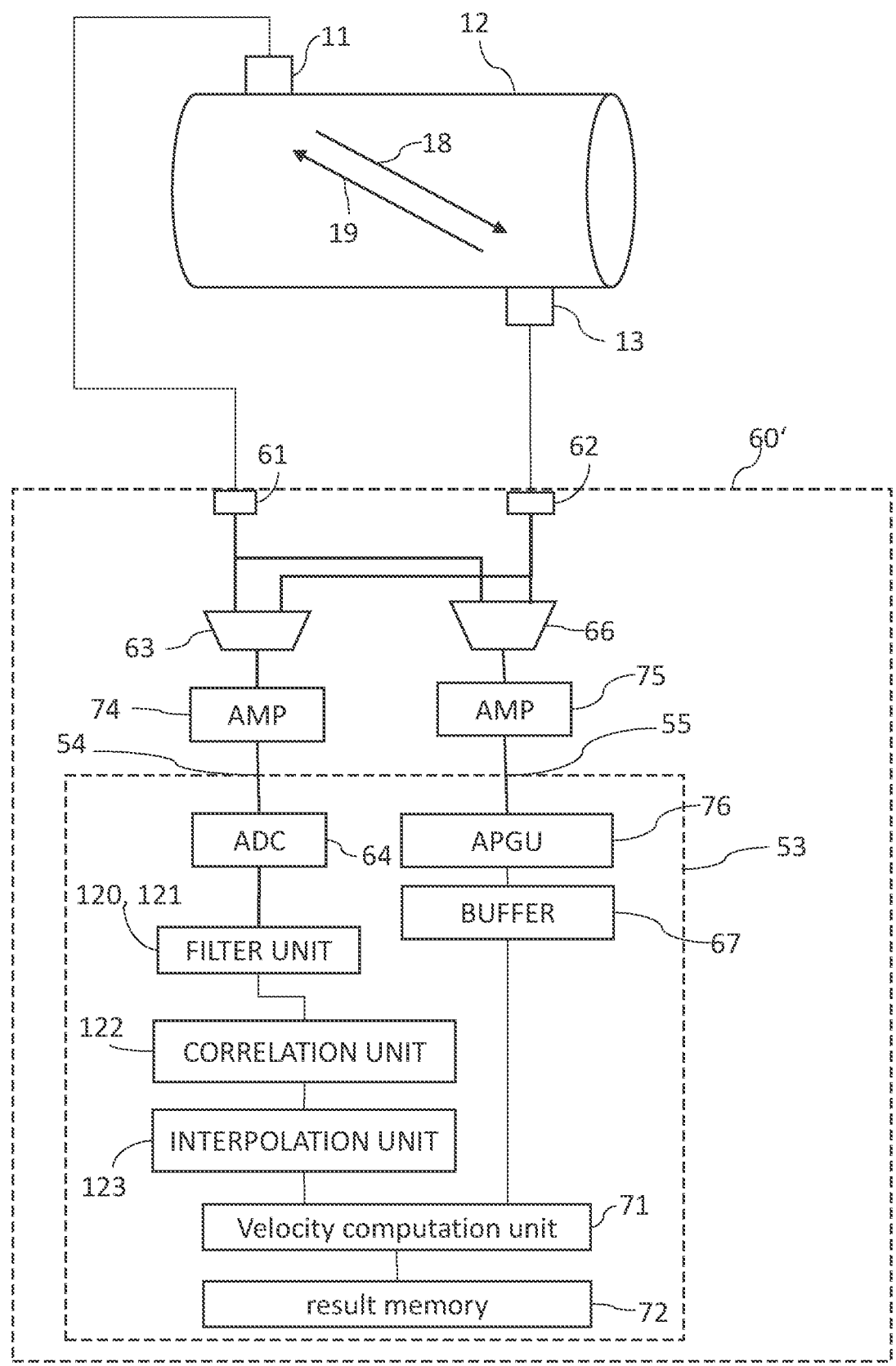
FIG. 22 shows a further embodiment of a proposed flow speed measuring device.

FIG. 22 shows, by way of example, a further embodiment of a proposed flow measurement device 60' for measuring a flow speed of a fluid in a fluid conduit 12 with an ultrasonic travel time flow meter 60' using a digital time reversal acoustics filter method.

The buffer 67 is connected to an adjustable pulse generator unit 76. The ADC 64 is furthermore connected to digital filter units 120, 121. The digital filter units 120, 121 are connected to a correlation unit 122, which is connected to an interpolation unit 123. The interpolation unit 123 is connected to a velocity computation unit 71, which is connected both to a result memory 72 and to the buffer 67.

REFERENCE LIST 10 flow meter arrangement
11 upstream piezoelectric element
12 conduit
13 downstream piezoelectric element
14 direction of average flow
15 first computation unit
16 second computation unit
17 signal path
20 signal path
22 piezoelectric element
23 piezoelectric element
31-52 piezoelectric elements
53 electronic processing unit
54 connector pin
55 connector pin
56 connector pin
60, 60' flow measurement device
61 first connector
62 second connector
63 multiplexer
64 ADC
66 demultiplexer
67 digital buffer
68 matching module
69 waveform generator
70 waveform database
71 velocity computation unit
72 result memory
73 measuring signal generator
74 first amplifier
75 second amplifier
76 adjustable pulse generator unit
77 channel
90-96 method steps
100-106 method steps
110-117 method steps
120 1st digital filter
121 2nd digital filter
122 correlation unit
123 interpolation unit
129 PWM-signal
130 TRA-signal
131 response signal to PWM signal
132 response signal to TRA signal
133 measured time delays
134 probability density
135 measured time delays
136 probability density
137 measured time delays
138 probability density

What is claimed is:

1. A method for determining a flow speed of a fluid in a channel (77) with a fluid conduit (12) with an ultrasonic travel time flow meter (60) using a digital time reversal acoustics filter method, the method comprising the following steps:

executing a training process with an adjustable pulse generator unit (76), the training process comprising the steps:

applying an input signal (x[n]) to a first ultrasonic transducer (11), the first ultrasonic transducer (11) being mounted to the fluid conduit (12) at a first location;

receiving a first response signal to the input signal (x[n]) at a second ultrasonic transducer (13), the second ultrasonic transducer (13) being mounted to the fluid conduit (12) at a second location, the second position being upstream or downstream from the first location with respect to a flow direction (14) of the fluid;

converting the first response signal into a first digitized response signal using an analog-to-digital converter (64); and deriving a first digital response filter (120) from the first digitized response signal by inverting the first digitized response signal with respect to time;

applying the input signal (x[n]) to the second ultrasonic transducer (13);

receiving a second response signal to the input signal (x[n]) at the first ultrasonic transducer (11);

converting the second response signal into a second digitized response signal using the analog-to-digital converter (64); and deriving a second digital response filter (121) from the second digitized response signal by inverting the second digitized response signal with respect to time;

executing a measurement process with the adjustable pulse generator unit (76), the measurement process comprising the steps:

applying the input signal (x[n]) to the first ultrasonic transducer (11);

receiving a third response signal of the input signal (x[n]) at the second ultrasonic transducer (13);

converting the response signal into a third digitized response signal ($y_{12}'[n]$) using the analog-to-digital converter (64);

executing a reverse direction measurement process with the adjustable pulse generator unit (76), the reverse direction measurement process comprising the steps:

applying the input signal (x[n]) to the second ultrasonic transducer (13);

receiving a fourth response signal of the input signal (x[n]) at the first ultrasonic transducer (11);

converting the fourth response signal into a fourth digitized reverse direction response signal ($y_{21}'[n]$) using the analog-to-digital converter (64);

deriving a first correlation input signal ($y_{12}[n]$) from the third digitized response signal ($y_{12}'[n]$) and the first digital response filter (120);

deriving a second correlation input signal ($y_{21}[n]$) from the fourth digitized response signal ($y_{21}'[n]$) and the second digital response filter (121); and deriving a difference time of flight ($\Delta T$) from the first correlation input signal ($y_{12}[n]$) and the second correlation input signal ($y_{21}[n]$) by computing a discrete correlation of the first correlation input signal ($y_{12}[n]$) with the second correlation input signal ($y_{21}[n]$), wherein a time index of a maximum value of the discrete correlation using an interpolation method is determined.

2. The method of claim 1, wherein the second digital response filter (121) is equal to the first digital response filter (120).

3. The method of claim 1, wherein the second digital response filter (121) is a digital reverse direction response filter, wherein a determination of the reverse direction response filter comprises the following steps:

executing a reverse direction training process with the adjustable pulse generator unit (76);

applying the reverse direction input signal (x[n]) to the second ultrasonic transducer (13);

receiving a reverse direction response signal to the reverse direction training signal at the first ultrasonic transducer (11);

converting the reverse direction response signal into a digitized reverse direction response signal using the analog-to-digital converter (64);

deriving digital reverse direction response filter taps ($h_{MF,21}[n]$) from the digitized reverse direction response signal; and deriving the second digital response filter (121) from the digital reverse direction response filter taps ($h_{MF,21}[n]$).

4. A method for determining a flow speed of a fluid in a channel (77) with a fluid conduit (12) with an ultrasonic travel time flow meter (60) using a digital time reversal acoustics filter method, the method comprising the steps:

executing a training process with an adjustable pulse generator unit (76), the training process comprising the steps:

applying an input signal (x[n]) to a first ultrasonic transducer (11), the first ultrasonic transducer (11) being mounted to the fluid conduit (12) at a first location;

receiving a first response signal to the input signal (x[n]) at a second ultrasonic transducer (13), the second ultrasonic transducer (13) being mounted to the fluid conduit (12) at a second location, the second location being upstream or downstream from the first location with respect to a flow direction of the fluid;

converting the first response signal into a first digitized response signal using an analog-to-digital converter (64);

determining a first digital response filter with filter taps ($h_{MF,12}[n]$) from the first digitized response signal;

applying the input signal (x[n]) to the second ultrasonic transducer (13);

receiving a second response signal at the first ultrasonic transducer (11);

converting the second response signal into a second digitized response signal using the analog-to-digital converter (64); and determining a second digital response filter with filter taps ($h_{MF,21}[n]$) from the second digitized response signal, executing a measurement process with the adjustable pulse generator unit (76), the measurement process comprising the steps:

applying the input signal (x[n]) to the first ultrasonic transducer (11);

receiving a third response signal of the input signal (x[n]) at the second ultrasonic transducer (13);

converting the third response signal into a third digitized response signal ($y^{12'}[n]$) using the analog-to-digital converter (64);

executing a reverse direction measurement process with the adjustable pulse generator unit (76), the reverse direction measurement process comprising the steps:

applying the input signal (x[n]) to the second ultrasonic transducer (13);

receiving a fourth response signal of the input signal (x[n]) at the first ultrasonic transducer (11);

converting the fourth response signal into a fourth digitized response signal ($y_{21}'[n]$) using the analog-to-digital converter (64);

deriving a first time of flight ($T_{abs,12}$) from the third digitized response signal ($y_{12}'[n]$) and the first digitized response signal by computing a discrete correlation of the third digitized response signal ($y_{12}'[n]$) with the first digitized response signal, wherein a time index of a maximum value of the discrete correlation using an interpolation method is determined;

deriving a second time of flight ($T_{abs,21}$) from the fourth digitized response signal ($y_{21}'[n]$) and the second digitized response signal by computing a discrete correlation of the fourth digitized response signal ($y_{21}'[n]$) with the second digitized response signal, wherein a time index of a maximum value of the discrete correlation using an interpolation method is determined; and deriving a difference of time of flight ($\Delta T$) by a subtraction of the previously derived times of flight ($T_{abs,12}$, $T_{abs,21}$).

5. The method of claim 4, wherein the second digital response filter is equal to the first digital response filter.

6. The method of claim 4, wherein the first digital response filter is a forward direction response filter;
   wherein the second digital response filter is a reverse direction response filter;
   wherein filter taps ($h_{MF,12}$) of the forward direction response filter are derived from the first digitized response signal; and
   wherein filter taps ($h_{MF,21}$) of the reverse direction response filter are derived from the second digitized response signal.

7. A method for determining a flow speed of a fluid in a fluid conduit (12) using an ultrasonic travel time flow meter, the method comprising the steps:
   generating a training signal with an adjustable pulse generator unit (76);
   applying the training signal to a first ultrasonic transducer (11), the first ultrasonic transducer (11) being mounted to the fluid conduit (12) at a first position;
   receiving a response signal to the training signal at a second ultrasonic transducer (13), the second ultrasonic transducer (13) being mounted to the fluid conduit (12) at a second position, the second position being upstream or downstream from the first position with respect to a flow direction of the fluid;
   converting the response signal into a digitized response signal using an analog-to-digital converter (64);
   inverting the digitized response signal with respect to time in order to obtain an inverted digitized response signal;
   generating a pulse width modulated measuring signal from the inverted digitized response signal;
   applying the pulse width modulated measuring signal to the first ultrasonic transducer (11);
   receiving a response signal of the pulse width modulated measuring signal at the second ultrasonic transducer (13); and
   deriving a time of flight ($\Delta T$) from the response signal.

8. An electronic processing unit (53) for determining a flow speed of a fluid in a channel (77) with a fluid conduit (12) with an ultrasonic travel time flow meter (60) using a digital time reversal acoustics filter method, comprising:
   an adjustable pulse generator unit (76), the pulse generator unit (76) being operative to execute a training process with an input signal ($x[n]$);
   a transmitting means, the transmitting means being operative to apply the input signal ($x[n]$) to a first ultrasonic transducer (11), the first ultrasonic transducer (11) being mounted to the fluid conduit (12) at a first location;
   a receiving means, the receiving means being operative to receive a first response signal to the input signal ($x[n]$) at a second ultrasonic transducer (13), the second ultrasonic transducer (13) being mounted to the fluid conduit (12) at a second location, the second location being upstream or downstream from the first location with respect to a flow direction of the fluid;
   an analog-to digital converter (64), the analog to digital converter (64) being operative to convert the first response signal into a first digitized response signal;
   a processing means, the processing means being operative to determine a first digital response filter (120) with FIR-filter taps ($h_{MF12}[n]$) from the digitized response signal by inverting the digitized response signal with respect to time;
   the transmitting means further being operative to apply the input signal ($x[n]$) to a second ultrasonic transducer (13), the second ultrasonic transducer (13) being mounted to the fluid conduit (12) at the second location;
   the receiving means further being operative to receive a second response signal to the input signal ($x[n]$) at the first ultrasonic transducer (11);
   the analog to digital converter (64) further being operative to convert the second response signal into a second digitized response signal;
   the processing means further being operative to determine a second digital response filter (121) with FIR-filter taps ($h_{MF,21}[n]$) from the second digitized response signal by inverting the digitized response signal with respect to time;
   the adjustable pulse generator unit (76) being further operative to execute a measurement process with the input signal ($x[n]$);
   the transmitting means being further operative to apply the input signal ($x[n]$) of the measurement process to the first ultrasonic transducer (11);
   the receiving means being further operative to receive a third response signal of the input signal ($x[n]$) of the measurement process at the second ultrasonic transducer (13);
   the processing means being further operative to convert the third response signal into a third digitized response signal ($y_{12}'$) using the analog-to-digital converter (64);
   the adjustable pulse generator unit (76) being further operative to execute a reverse direction measurement process with the input signal ($x[n]$);
   the transmitting means being further operative to apply the input signal ($x[n]$) of the reverse direction measurement process to the second ultrasonic transducer (13);
   the receiving means being further operative to receive a fourth response signal of the reverse direction measurement process at the first ultrasonic transducer (11);
   the analog-to-digital-converter (64) being further operative to convert the fourth response signal of the reverse direction measurement process into a fourth digitized response signal ($y_{21}'$) using the analog-to-digital converter (64);
   the processing means being further operative to:
   derive a first correlation input signal ($y_{12}$) from the third digitized response signal ($y_{12}'$) and the first digital response filter (120);
   derive a second correlation input signal ($y_{21}$) from the fourth digitized response signal ($y_{21}'$) and the second digital response filter (121);
   derive a difference time of flight ($\Delta T$) from the first correlation input signal ($y_{12}[n]$) and the second correlation input signal ($y_{21}[n]$) by computing a discrete correlation of the first correlation input signal ($y_{12}[n]$)

and the second correlation input signal ($y_{21}[n]$), and determining a time index of a maximum value of the discrete correlation using an interpolation method.

9. The electronic processing unit (53) of claim 8, wherein the second digital response filter (121) is equal to the first digital response filter (120).

10. The electronic processing unit (53) of claim 8, wherein the second digital response filter (121) is a digital reverse direction response filter, and wherein the electronic processing unit (53) is further operative to generate a reverse direction training signal with an adjustable pulse generator unit (76);

apply the reverse direction training signal to the second ultrasonic transducer (13);

receive a reverse direction response signal to the reverse direction training signal at the first ultrasonic transducer (11);

convert the reverse direction response signal into a digitized reverse direction response signal using an analog-to-digital converter (64); and derive the second digital response filter (121) with FIR filter taps ($h_{MF,21}[n]$) from the digitized reverse direction response signal.

\* \* \* \* \*